United States Patent
Chai

(10) Patent No.: US 11,489,969 B2
(45) Date of Patent: *Nov. 1, 2022

(54) CHARGING METHOD, APPARATUS, AND SYSTEM

(71) Applicant: HUAWEI TECHNOLOGIES CO., LTD., Guangdong (CN)

(72) Inventor: Xiaoqian Chai, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/184,488

(22) Filed: Feb. 24, 2021

(65) Prior Publication Data

US 2021/0185177 A1 Jun. 17, 2021

Related U.S. Application Data

(63) Continuation of application No. 16/821,541, filed on Mar. 17, 2020, now Pat. No. 10,958,794, which is a
(Continued)

(30) Foreign Application Priority Data

Nov. 16, 2017 (CN) .......................... 201711139728.2

(51) Int. Cl.
*H04M 15/00* (2006.01)
*H04L 12/14* (2006.01)
*H04W 4/24* (2018.01)

(52) U.S. Cl.
CPC ........ *H04M 15/65* (2013.01); *H04L 12/1403* (2013.01); *H04M 15/61* (2013.01); *H04W 4/24* (2013.01)

(58) Field of Classification Search
CPC ......... H04W 4/24; H04W 4/70; H04W 88/16; H04W 76/11; H04M 15/64; H04M 15/41;
(Continued)

(56) References Cited

U.S. PATENT DOCUMENTS 8,295,456 B2 * 10/2012 Cai ..................... H04L 12/1403
379/114.01
9,479,917 B1 10/2016 Gota et al.
(Continued)

FOREIGN PATENT DOCUMENTS

CN 1859136 11/2006
CN 1859533 A 11/2006
(Continued)

OTHER PUBLICATIONS

Extended European Search Report issued in European Application No. 18878201.5 dated Jul. 1, 2020, 13 pages.
(Continued)

*Primary Examiner* — Dung Hong
(74) *Attorney, Agent, or Firm* — Fish & Richardson P.C.

(57) ABSTRACT

Example charging methods and apparatus are described. One example method includes sending a service resource create request to a charging system by a charging trigger apparatus. The charging trigger apparatus receives a service resource create response sent by the charging system. The service resource create request is used to request the charging system to create a service resource corresponding to a service in a session. The session is used to provide a data connection service to user equipment. The service resource is used to manage requesting for a quota for the service in the session and/or manage reporting of usage information of the service in the session. The service resource create response includes a first resource identifier, and the first resource identifier is used to identify the service resource
(Continued)

that corresponds to the service in the session and that is created by the charging system.

44 Claims, 5 Drawing Sheets

Related U.S. Application Data continuation of application No. PCT/CN2018/098208, filed on Aug. 2, 2018.

(58) Field of Classification Search
CPC ...... H04M 15/00; H04M 15/65; H04M 15/66; H04M 15/8228; H04M 15/62; H04M 15/61; H04M 15/58; H04M 15/60; H04M 15/63

See application file for complete search history.

(56) References Cited

U.S. PATENT DOCUMENTS

| | | | |
|---|---|---|---|
| 10,958,794 B2* | 3/2021 | Chai | H04M 15/66 |
| 2009/0264096 A1* | 10/2009 | Cai | H04L 12/1446 455/406 |
| 2009/0264097 A1* | 10/2009 | Cai | G06Q 30/04 455/406 |
| 2011/0161248 A1* | 6/2011 | Cai | H04L 12/1467 705/400 |
| 2011/0270722 A1 | 11/2011 | Cai et al. | |
| 2013/0003529 A1* | 1/2013 | Lopez Nieto | H04L 12/14 370/221 |
| 2013/0010651 A1 | 1/2013 | Cai et al. | |
| 2013/0017803 A1* | 1/2013 | Li | H04M 15/854 455/406 |
| 2013/0091281 A1* | 4/2013 | Chai | H04L 12/1425 709/225 |
| 2015/0156334 A1* | 6/2015 | Chai | H04M 15/64 455/406 |
| 2015/0319315 A1 | 11/2015 | Chai | |
| 2016/0036598 A1* | 2/2016 | Chai | H04M 15/61 370/259 |
| 2017/0264751 A1 | 9/2017 | Chai | |
| 2017/0272894 A1* | 9/2017 | Wang | G06Q 10/10 |
| 2017/0303227 A1* | 10/2017 | Choi | H04L 67/12 |
| 2017/0311303 A1* | 10/2017 | Ahn | H04W 72/0406 |
| 2018/0145982 A1* | 5/2018 | Wang | H04W 88/16 |
| 2018/0249301 A1* | 8/2018 | Jeong | H04W 4/08 |
| 2018/0262625 A1* | 9/2018 | McCarley | H04L 12/1407 |
| 2018/0295196 A1* | 10/2018 | Jeong | H04W 8/18 |
| 2018/0309800 A1* | 10/2018 | Aravamudhan | H04M 15/57 |
| 2019/0305975 A1* | 10/2019 | Lovsen | H04L 12/1446 |
| 2019/0349269 A1* | 11/2019 | Li | H04M 15/785 |
| 2019/0387373 A1 | 12/2019 | Chai | |
| 2020/0252763 A1* | 8/2020 | Tornkvist | H04M 15/64 |

FOREIGN PATENT DOCUMENTS

| | | |
|---|---|---|
| CN | 101005384 A | 7/2007 |
| CN | 101047518 | 10/2007 |
| CN | 101132289 | 2/2008 |
| CN | 101425908 | 5/2009 |
| CN | 101488864 | 7/2009 |
| CN | 102547640 | 7/2012 |
| CN | 102388564 | 11/2014 |
| CN | 104221418 | 12/2014 |
| CN | 104468135 | 3/2015 |
| JP | 2018504003 A | 2/2018 |
| WO | WO2013100829 | 7/2013 |
| WO | 2016078090 A1 | 5/2016 |

OTHER PUBLICATIONS

Office Action issued in Chinese Application No. 201711139728.2 dated Feb. 6, 2020, 29 pages (with English translation).

Office Action issued in Chinese Application No. 202010057303.2 dated Sep. 7, 2020, 16 pages (with English translation).

PCT International Search Report and Written Opinion issued in International Application No. PCT/CN2018/098208 dated Oct. 16, 2018, 17 pages (with English translation).

Office Action issued in Chinese Application No. 202011134588.1 dated Jul. 14, 2021, 7 pages (with English translation).

3GPP TS 32.299 V15.0.0 (Sep. 2017), "3rd Generation Partnership Project;Technical Specification Group Services and System Aspects;Telecommunication management;Charging management;Diameter charging applications(Release 15)," Sep. 2017, 13 pages.

Office Action issued in Japanese Application No. 2020-526978 dated Jun. 8, 2021, 10 pages (with English translation).

3GPP TS 23.501 V1.5.0 (Nov. 2017), "3rd Generation Partnership Project;Technical Specification Group Services and System Aspects-;System Architecture for the 5G System;Stage 2(Release 15)," Nov. 2017, 170 pages.

* cited by examiner

CHARGING METHOD, APPARATUS, AND SYSTEM

CROSS-REFERENCE TO RELATED APPLICATIONS

This application is a continuation of U.S. patent application Ser. No. 16/821,541 filed on Mar. 17, 2020, which is a continuation of International Application No. PCT/CN2018/098208, filed on Aug. 2, 2018, which claims priority to Chinese Patent Application No. 201711139728.2, filed on Nov. 16, 2017. All of the afore-mentioned patent applications are hereby incorporated by reference in their entireties.

TECHNICAL FIELD

This disclosure relates to the field of communications technologies, and in particular, to a charging method, an apparatus, and a system.

BACKGROUND

At present, in a communications system, charging for an online charging service and charging for an offline charging service are performed in different charging systems. As shown in FIG. 1 a charging trigger apparatus in a communications system communicates with an online charging system by using an Ro interface, and communicates with an offline charging system by using an Rf interface. The online charging system is configured to perform charging for an online charging service, and the offline charging system is configured to perform charging for an offline charging service.

However, the separation between the online charging system and the offline charging system makes service charging relatively complex.

SUMMARY

A charging method, an apparatus, and a system that are provided in embodiments of this disclosure help simplify a manner of charging for a service.

According to a first aspect, an embodiment of this disclosure provides a charging method, including:

sending, by a charging trigger apparatus, a service resource create request to a charging system, and then receiving a service resource create response sent by the charging system, wherein the service resource create request is used to request the charging system to create a service resource corresponding to a service in a session, the session is used to provide a data connection service to user equipment, the service resource is used to manage requesting for a quota for the service in the session and/or manage reporting of usage information of the service in the session, the service resource create response includes a first resource identifier, and the first resource identifier is used to identify the service resource that corresponds to the service in the session and that is created by the charging system.

In this embodiment of this disclosure, the service resource is introduced, so that by operating the service resource, both charging for an online charging service and charging for an offline charging service can be performed, thereby integration of both online charging and offline charging is achieved. Compared with a manner in which online charging and offline charging are separately performed in the prior art, a manner of charging for a service is simplified to some extent.

In this embodiment of this disclosure, to improve efficiency and scalability of the charging system and the charging trigger apparatus, in a possible design, when the charging trigger apparatus needs to request a quota for the service in the session or report usage information of the service in the session and there is no available service resource, the charging trigger apparatus sends the service resource create request to the charging system.

In a possible design, the service resource create request includes a session identifier and a user identifier corresponding to the user equipment, and the session identifier is used to identify the session. This technical solution helps the charging system be able to distinguish among different types of services of different users during service charging.

In a possible design, the service resource create request is used to request the charging system to create a first service resource, and the first service resource corresponds to all services in the session, wherein all the services in the session are online charging services; or all the services in the session are offline charging services; or all the services in the session include an online charging service and an offline charging service.

In a possible design, the service resource create request is used to request the charging system to create a second service resource and a third service resource, wherein the second service resource corresponds to an online charging service in the session, and the third service resource corresponds to an offline charging service in the session; or in a possible design, the service resource create request is used to request the charging system to create a service resource corresponding to an online charging service in the session; or in a possible design, the service resource create request is used to request the charging system to create a service resource corresponding to an offline charging service in the session.

In a possible design, the service resource create request is used to request the charging system to create at least one service resource, and each of the at least one service resource corresponds to a service, in the session, that belongs to a same rating group.

In a possible design, when the service corresponding to the service resource that the charging system is requested to create by the service resource create request includes an online charging service, the service resource create request further includes quota request information for the online charging service and a rating group corresponding to the quota request information; or when the service corresponding to the service resource that the charging system is requested to create by the service resource create request includes an offline charging service, the service resource create request further includes a requested virtual quota for the offline charging service and a rating group corresponding to the requested virtual quota; or when the service corresponding to the service resource that the charging system is requested to create by the service resource create request includes an offline charging service, the service resource create request further includes usage information of the offline charging service and a rating group corresponding to the usage information.

This technical solution helps improve accuracy of service charging performed by the charging system.

In a possible design, the charging trigger apparatus sends a service resource update request to the charging system, wherein the service resource update request includes a second resource identifier, and the second resource identifier is used to identify a service resource, in the service resource identified by the first resource identifier, that the charging system is requested to update. This technical solution helps further improve the accuracy of service charging performed by the charging system.

In a possible design, when the service corresponding to the service resource identified by the second resource identifier include an online charging service, the service resource update request further includes quota request information for the online charging service, a rating group corresponding to the quota request information, usage information of the online charging service and a rating group corresponding to the usage information; or when the service corresponding to the service resource identified by the second resource identifier include an online charging service, the service resource update request further includes quota request information for the online charging service and a rating group corresponding to the quota request information; or when the service corresponding to the service resource identified by the second resource identifier includes an online charging service, the service resource update request further includes usage information of the online charging service and a rating group corresponding to the usage information; or when the service corresponding to the service resource identified by the second resource identifier include an offline charging service, the service resource update request further includes a requested virtual quota for the offline charging service, a rating group corresponding to the requested virtual quota, usage information of the offline charging service and a rating group corresponding to the usage information; or when the service corresponding to the service resource identified by the second resource identifier includes an offline charging service, the service resource update request further includes a requested virtual quota for the offline charging service and a rating group corresponding to the requested virtual quota; or when the service corresponding to the service resource identified by the second resource identifier includes an offline charging service, the service resource update request further includes usage information of the offline charging service and a rating group corresponding to the usage information.

This embodiment of this disclosure further provides a possible manner of triggering the charging trigger apparatus to send the service resource update request to the charging system: After receiving a service resource update notification sent by the charging system, the charging trigger apparatus sends the service resource update request to the charging system. Optionally, the service resource update notification includes a third resource identifier, and the third resource identifier is used to identify a service resource, in the service resource identified by the first resource identifier, that the charging system requests to be updated.

Further, in a possible design, the service resource update request further includes a rating group to which a service for which the charging system requests a service resource to be updated belongs, and the service is in the services corresponding to a service resource identified by the third resource identifier.

In addition, another possible manner of triggering the charging trigger apparatus to send the service resource update request to the charging system is: When a first charging trigger condition is met, the charging trigger apparatus sends the service resource update request to the charging system.

In a possible design, the charging trigger apparatus sends a service resource delete request to the charging system, wherein the service resource delete request includes a fourth resource identifier, and the fourth resource identifier is used to identify a service resource to be deleted from the service resource identified by the first resource identifier. The foregoing manner helps the charging system release the created service resource, to improve resource utilization in the charging system.

For example, when a second charging trigger condition is met, the charging trigger apparatus sends the service resource delete request to the charging system.

In a possible design, when the service corresponding to the service resource identified by the fourth resource identifier include an online charging service, the service resource delete request further includes usage information of the online charging service and a rating group corresponding to the usage information; or when the service corresponding to the service resource identified by the fourth resource identifier includes an offline charging service, the service resource delete request further includes usage information of the offline charging service and a rating group corresponding to the usage information.

According to a second aspect, an embodiment of this disclosure provides a charging method, including:

receiving, by a charging system, a service resource create request sent by a charging trigger apparatus, and then sending a service resource create response to the charging trigger apparatus, wherein the service resource create request is used to request the charging system to create a service resource corresponding to a service in a session, the session is used to provide a data connection service to user equipment, the service resource is used to manage requesting for a quota for the service in the session and/or manage reporting of usage information of the service in the session, the service resource create response includes a first resource identifier, and the first resource identifier is used to identify the service resource that corresponds to the service in the session and that is created by the charging system.

In this embodiment of this disclosure, the service resource is introduced, so that by operating the service resource, both charging for an online charging service and charging for an offline charging service can be performed, thereby integration of both online charging and offline charging is achieved. Compared with a manner in which online charging and offline charging are separately performed in the prior art, a manner of charging for a service is simplified to some extent.

In a possible design, the service resource create request includes a session identifier and a user identifier corresponding to the user equipment, and the session identifier is used to identify the session. This technical solution helps the charging system be able to distinguish among different types of services of different users during service charging.

In a possible design, the service resource create request is used to request the charging system to create a first service resource, wherein the first service resource corresponds to all services in the session, wherein all the services in the session are online charging services; or all the services in the session are offline charging services; or all the services in the session include an online charging service and an offline charging service.

In a possible design, the service resource create request is used to request the charging system to create a second service resource and a third service resource, wherein the second service resource corresponds to an online charging service in the session, and the third service resource corresponds to an offline charging service in the session; or in a possible design, the service resource create request is used to request the charging system to create a service resource corresponding to an online charging service in the session; or in a possible design, the service resource create request is used to request the charging system to create a service resource corresponding to an offline charging service in the session.

In a possible design, the service resource create request is used to request the charging system to create at least one service resource, and each of the at least one service resource corresponds to a service, in the session, that belongs to a same rating group.

In a possible design, when the service corresponding to the service resource that the charging system is requested to create by the service resource create request includes an online charging service, the service resource create request further includes quota request information for the online charging service and a rating group corresponding to the quota request information; or when the service corresponding to the service resource that the charging system is requested to create by the service resource create request includes an offline charging service, the service resource create request further includes a requested virtual quota for the offline charging service and a rating group corresponding to the requested virtual quota; or when the service corresponding to the service resource that the charging system is requested to create by the service resource create request includes an offline charging service, the service resource create request further includes usage information of the offline charging service and a rating group corresponding to the usage information.

This technical solution helps improve accuracy of service charging performed by the charging system.

It should be noted that, for example, that the charging system reserves, from account balance of the user equipment, a quota that corresponds to the rating group and that is requested by using the service resource create request, and allocates the quota to the online charging service may be applied to a case in which the service resource create request further includes the quota request information for the online charging service and the rating group corresponding to the quota request information. For another example, that the charging system allocates, to the offline charging service, a virtual quota that corresponds to the rating group and that is requested by using the service resource create request, without reserving the virtual quota from account balance of the user equipment may be applied to a case in which the service resource create request further includes the requested virtual quota for the offline charging service and the rating group corresponding to the requested virtual quota. For another example, that the charging system generates a charging data record based on the usage information of the offline charging service and the rating group corresponding to the usage information may be applied to a case in which the service resource create request further includes the usage information of the offline charging service and the rating group corresponding to the usage information.

In a possible design, the charging system receives a service resource update request sent by the charging trigger apparatus, and updates, based on the service resource update request, a service resource corresponding to a second resource identifier, wherein the service resource update request includes the second resource identifier, and the second resource identifier is used to identify a service resource, in the service resource identified by the first resource identifier, that the charging system is requested to update. This technical solution helps further improve the accuracy of charging performed by the charging system for a service.

In a possible design, when the service corresponding to the service resource identified by the second resource identifier includes an online charging service, the service resource update request further includes quota request information for the online charging service, a rating group corresponding to the quota request information, usage information of the online charging service and a rating group corresponding to the usage information; or when the service corresponding to the service resource identified by the second resource identifier includes an online charging service, the service resource update request further includes quota request information for the online charging service and a rating group corresponding to the quota request information; or when the service corresponding to the service resource identified by the second resource identifier includes an online charging service, the service resource update request further includes usage information of the online charging service and a rating group corresponding to the usage information; or when the service corresponding to the service resource identified by the second resource identifier includes an offline charging service, the service resource update request further includes a requested virtual quota for the offline charging service, a rating group corresponding to the requested virtual quota, usage information of the offline charging service and a rating group corresponding to the usage information; or when the service corresponding to the service resource identified by the second resource identifier includes an offline charging service, the service resource update request further includes a requested virtual quota for the offline charging service and a rating group corresponding to the requested virtual quota or when the service corresponding to the service resource identified by the second resource identifier includes an offline charging service, the service resource update request further includes usage information of the offline charging service and a rating group corresponding to the usage information.

It should be noted that the charging system may update, based on the service resource update request in the following manners, the service resource corresponding to the second resource identifier:

For example, that the charging system reserves, from account balance of the user equipment, a quota that corresponds to the rating group and that is requested by using the service resource create request, allocates the quota to the online charging service, and subtracts, from the quota allocated to the online charging service based on the usage information of the online charging service and the rating group corresponding to the usage information, a part used by the online charging service may be applied to a case in which the service resource update request further includes the quota request information for the online charging service and the rating group corresponding to the quota request information, and the usage information of the online charging service and the rating group corresponding to the usage information. For another example, that the charging system reserves, from account balance of the user equipment, a quota that corresponds to the rating group and that is applied for by using the service resource create request, and allocates the quota to the online charging service may be applied to a case in which the service resource create request further includes the quota request information for the online charging service and the rating group corresponding to the quota request information. For another example, that the charging system subtracts, from a quota allocated to the online charging service based on the usage information of the online charging service and the rating group corresponding to the usage information, a part used by the online charging service may be applied to a case in which the service resource update request further includes the usage information of the online charging service and the rating group corresponding to the usage information. For another example, that the charging system allocates, to the offline charging service, a virtual quota that corresponds to the rating group and that is requested by using the service resource create request, and generates a charging data record based on the usage information of the offline charging service and the rating group corresponding to the usage information may be applied to a case in which the service resource update request further includes the requested virtual quota for the offline charging service and the rating group corresponding to the requested virtual quota, and the usage information of the offline charging service and the rating group corresponding to the usage information. For another example, that the charging system allocates, to the offline charging service, a virtual quota that corresponds to the rating group and that is requested by using the service resource create request may be applied to a case in which the service resource update request further includes the requested virtual quota for the offline charging service and the rating group corresponding to the requested virtual quota. For another example, that the charging system generates a charging data record based on the usage information of the offline charging service and the rating group corresponding to the usage information may be applied to a case in which the service resource create request further includes the usage information of the offline charging service and the rating group corresponding to the usage information.

This embodiment of this disclosure further provides a possible manner of triggering the charging trigger apparatus to send the service resource update request to the charging system: After sending a service resource update notification to the charging trigger apparatus, the charging system receives the service resource update request sent by the charging trigger apparatus. The service resource update notification includes a third resource identifier, and the third resource identifier is used to identify a service resource, in the service resource identified by the first resource identifier, that the charging system requests to be updated.

Further, in a possible design, the service resource update request further includes a rating group to which a service for which the charging system requests a service resource to be updated belongs, and the service is in the services corresponding to a service resource identified by the third resource identifier.

In a possible design, the charging system receives a service resource delete request sent by the charging trigger apparatus, and deletes, based on the service resource delete request, a service resource identified by a fourth resource identifier, wherein the service resource delete request includes the fourth resource identifier, and the fourth resource identifier is used to identify a service resource to be deleted from the service resource identified by the first resource identifier. The foregoing manner helps the charging system release the created service resource, to improve resource utilization in the charging system.

In a possible design, when the service corresponding to the sell ice resource identified by the fourth resource identifier includes an online charging service, the service resource delete request further includes usage information of the online charging service and a rating group corresponding to the usage information; or when the service corresponding to the service resource identified by the fourth resource identifier includes an offline charging service, the service resource delete request further includes usage information of the offline charging service and a rating group corresponding to the usage information.

It should be noted that the charging system subtracts, from a quota for the online charging service based on the usage information of the online charging service and the rating group corresponding to the usage information, a part used by the online charging service. Such technical solution may be applied to a case in which the service resource delete request further includes the usage information of the online charging service and the rating group corresponding to the usage information. That the charging system generates a charging data record based on the usage information of the offline charging service and the rating group corresponding to the usage information may be applied to a case in which the service resource delete request further includes the usage information of the offline charging service and the rating group corresponding to the usage information.

According to a third aspect, a charging trigger apparatus provided in an embodiment of this disclosure may be a network device, or may be a chip in a network device. The charging trigger apparatus has a function of implementing the technical solutions of the first aspect and the possible designs of the first aspect. The function may be implemented by using hardware, or may be implemented by hardware executing corresponding software. The hardware or the software includes one or more modules corresponding to the foregoing function.

In a possible design, the charging trigger apparatus includes a processing unit and a communications unit. The processing unit may be, for example, a processor. The communications unit may be, for example, a communications interface. Optionally, the processor may be connected to the communications interface in a wired manner such as an optical fiber or a twisted pair. The communications unit may alternatively be a transceiver, and the transceiver may include a radio frequency circuit. Optionally, the processor may be connected to the transceiver in a wireless manner such as wireless fidelity (Wi-Fi).

Specifically, the processing unit is configured to generate a service resource create request; and the communications unit is configured to: send the service resource create request to a charging system, and then receive a service resource create response sent by the charging system. The service resource create request is used to request the charging system to create a service resource corresponding to a service in a session, the session is used to provide a data connection service to user equipment, the service resource is used to manage requesting for a quota for the service in the session and/or manage reporting of usage information of the service in the session, the service resource create response includes a first resource identifier, and the first resource identifier is used to identify the service resource that corresponds to the service in the session and that is created by the charging system.

In another possible design, the charging trigger apparatus includes a processor and a memory. The memory is configured to store a program, and the processor is configured to invoke the program stored in the memory, to implement the charging method in any one of the first aspect or the possible designs of the first aspect. It should be noted that the processor may send or receive data by using an input/output interface, a pin, a circuit, or the like. The memory may be a register, a cache, or the like in the chip. In addition, the memory may alternatively be a storage unit, such as a read-only memory (ROM), another type of static storage device that can store static information and an instruction, or a random access memory (RAM), located outside of the chip in the network device.

The processor mentioned in any one of the foregoing possible designs may be a general-purpose central processing unit (CPU), a microprocessor, an application-specific integrated circuit (ASIC), or one or more integrated circuits that are configured to control the program of implementing the charging method in any one of the first aspect or the possible designs of the first aspect.

According to a fourth aspect, a charging system provided in an embodiment of this disclosure may be a network device, or may be a chip in a network device. The charging system has a function of implementing the technical solutions of the second aspect and the possible designs of the second aspect. The function may be implemented by using hardware, or may be implemented by hardware executing corresponding software. The hardware or the software includes one or more modules corresponding to the foregoing function.

In a possible design, the charging system includes a processing unit and a communications unit. The processing unit may be, for example, a processor. The communications unit may be, for example, a communications interface. Optionally, the processor may be connected to the communications interface in a wired manner such as an optical fiber or a twisted pair. The communications unit may alternatively be a transceiver, and the transceiver may include a radio frequency circuit. Optionally, the processor may be connected to the transceiver in a wireless manner such as Wi-Fi. Specifically, the communications unit is configured to receive a service resource create request sent by a charging trigger apparatus. The service resource create request is used to request the charging system to create a service resource corresponding to a service in a session, the session is used to provide a data connection service to user equipment, and the service resource is used to manage requesting for a quota for the service in the session and/or manage reporting of usage information of the service in the session. The processing unit is configured to: after the communications unit receives the service resource create request, generate a service resource create response. The service resource create response includes a first resource identifier, and the first resource identifier is used to identify the service resource that corresponds to the service in the session and that is created by the charging system. Then the communications unit is further configured to send the service resource create response to the charging trigger apparatus.

In another possible design, the charging system includes a processor and a memory. The memory is configured to store a program, and the processor is configured to invoke the program stored in the memory, to implement the charging method in any one of the second aspect or the possible designs of the second aspect. It should be noted that the processor may send or receive data by using an input/output interface, a pin, a circuit, or the like. The memory may be a register, a cache, or the like in the chip. In addition, the memory may alternatively be a storage unit, such as a ROM, another type of static storage device that can store static information and an instruction, or a RAM, located outside of the chip in the network device.

The processor mentioned in any of the foregoing possible designs may be a general-purpose CPU, a microprocessor, an ASIC, or one or more integrated circuits that are configured to control the program of implementing the charging method in any one of the second aspect or the possible designs of the second aspect.

According to a fifth aspect, an embodiment of this disclosure further provides a computer-readable storage medium. The computer-readable storage medium stores a program, and when the program is run on a computer, the computer is enabled to perform the method in the foregoing aspects.

According to a sixth aspect, this disclosure further provides a computer program product including an instruction. When the computer program product is run on a computer, the computer is enabled to perform the method in the foregoing aspects.

According to a seventh aspect, an embodiment of this disclosure further provides a communications system, including the charging trigger apparatus in any one of the third aspect or the possible designs of the third aspect, and the charging system in any one of the fourth aspect or the possible designs of the fourth aspect.

In addition, for technical effects of any one of the possible design of the second aspect to the seventh aspect, refer to the technical effects of different design of the first aspect, and details are not described herein again.

DESCRIPTION OF EMBODIMENTS

Figure 1:
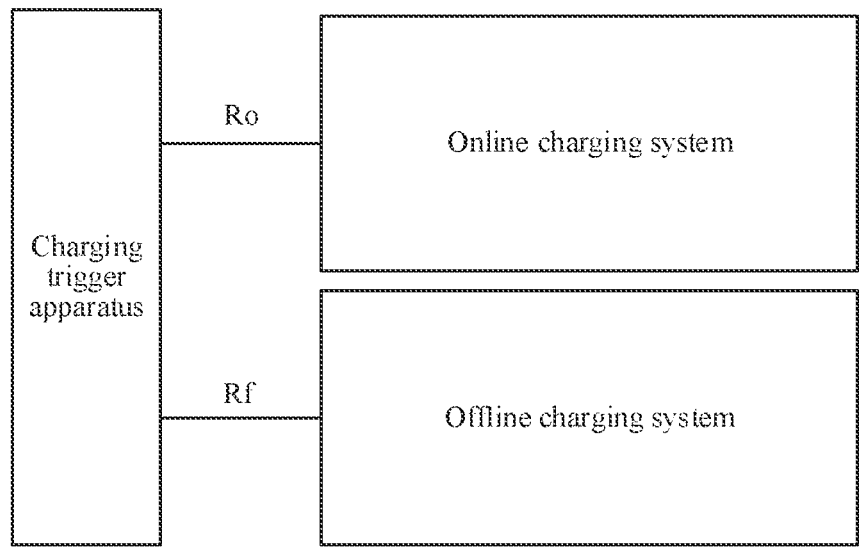
FIG. 1 is a schematic diagram of a charging architecture in the background.
Figure 2:
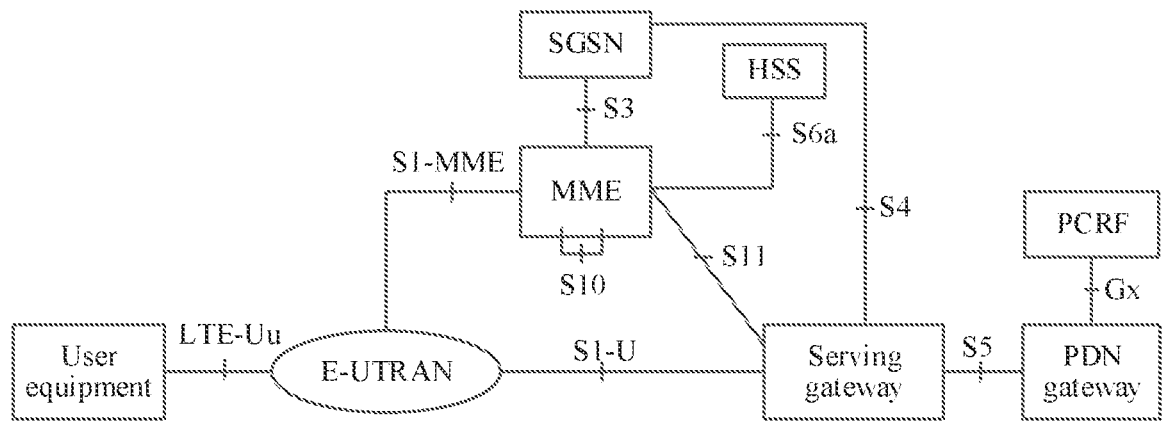
FIG. 2 is a schematic diagram of a possible network architecture to which an embodiment of this disclosure is applicable.

FIG. 2 is a schematic diagram of a possible network architecture to which an embodiment of this disclosure is applicable. The network architecture is a 4th generation mobile communication technology (4G) network architecture. Network elements in the 4G architecture include user equipment, a mobility management entity (MME), a serving GPRS support node (SGSN), a home subscriber server (HSS), a serving gateway (S-GW), a packet data network gateway (PDN gateway, P-GW), a policy and charging rules function (PCRF) entity, an evolved universal terrestrial radio access network (E-TURAN), and the like.

The E-UTRAN includes a plurality of evolved NodeBs (eNodeB). The eNodeBs are interconnected to each other by using an X2 interface, the eNodeBs are interconnected to an evolved packet core (EPC) by using an S1 interface, and the eNodeBs are interconnected to the user equipment by using LTE-Uu interface.

Main functions of the mobility management entity (MME) are: supporting a non-access stratum (NAS) message and security thereof, track area (TA) list management, P-GW and S-GW selection, MME selection when a cross-MME handover is performed, selection of an SGSN during a handover to a 2G/3G access system, user authentication, roaming control and bearer management, and mobility management between core network nodes of different 3rd generation partnership project (3GPP) access networks.

The S-GW is a gateway terminated at an E-UTRAN interface, and main functions of the S-GW include: When user equipment is handed over between base stations, the S-GW is used as a local anchor point and assists in completing a reordering function of the base stations. When a handover is performed between different 3GPP access systems, the S-GW is used as a mobility anchor point; performs a lawful interception function, data packet routing and forwarding, and packet marking on uplink and downlink transmission layers; and is used, for example, for charging between operators.

The P-GW is a gateway oriented to a packet data network (PDN) and terminated at an SGi interface. If the user equipment accesses a plurality of PDNs, the user equipment corresponds to one or more P-GWs. Main functions of the P-GW include: a user equipment-based packet filtering function, a lawful interception function, an interact protocol (IP) address allocation function for the user equipment, packet-transfer level marking performed in uplink, uplink and downlink service-level charging and control of a service level threshold, control of service-based uplink and downlink rates, and the like.

The HSS is a database configured to store subscription information of the user equipment, and a home network may include one or more HSSs. The HSS is responsible for storing information related to the user equipment, for example, a user identifier, a number and routing information, security information, location information, and profile information.

The SGSN may be configured to exchange signaling when user equipment is handed over between a 2G/3G access network and an E-UTRAN 3GPP access network. Functions of the SGSN include P-GW and S-GW selection, and MME selection for the user equipment that is handed over to the E-UTRAN 3GPP access network.

The PCRF entity is terminated at an Rx interface and a Ox interface. In a non-roaming scenario, there is only one PCRF related to an IP-connectivity access network (IP-CAN) session of the user equipment in a home public land mobile network (HPLMN); or in a roaming scenario and when a service flow is local breakout, there may be two PCRFs related to an IP-CAN session of the user equipment.

The user equipment is a device having a wireless sending and receiving function, and may be deployed on the land, including an indoor or outdoor device, a hand-held device, or an in-vehicle device; or may be deployed on the water (for example, on a steamer); or may be deployed in the air (for example, on an air plane, a balloon, or a satellite). Specifically, the user equipment may be user equipment (UE) that is accessible to a mobile network, a mobile phone, a tablet computer (pad), a computer having a wireless sending and receiving function, a virtual reality (VR) terminal, an augmented reality (AR) terminal, a wireless terminal in industrial control, a wireless terminal in self driving, a wireless terminal in telemedicine or remote medical, a wireless terminal in a smart grid, a wireless terminal in transportation safety, a wireless terminal in a smart city, a wireless terminal in a smart home, or the like.

Figure 3:
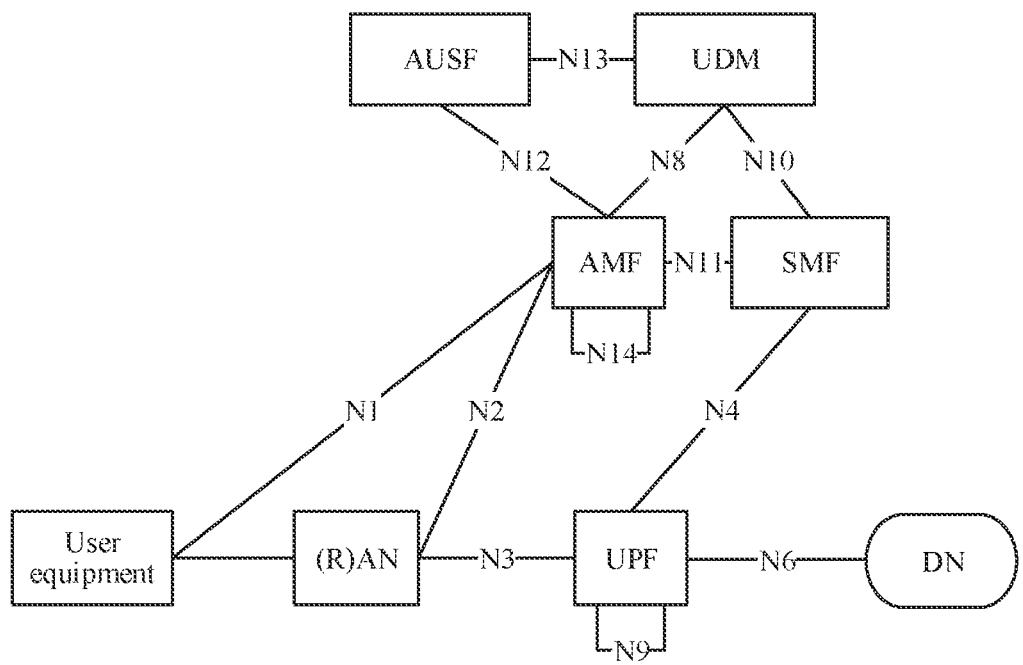
FIG. 3 is a schematic diagram of another possible network architecture to which an embodiment of this disclosure is applicable.

FIG. 3 is a schematic diagram of another possible network architecture to which an embodiment of this disclosure is applicable. The network architecture is a 5th generation mobile communication technology (5G) network architecture. The 5G architecture may include user equipment, a radio access network (RAN), an AMF entity, a session management function (SMF) entity, a user plane function (UPF) entity, a unified data management (UDM) entity, an authentication server function (AUSF) entity, and a data network (DN). In addition to the network elements shown in FIG. 2, the 5G network architecture may further include an authentication credential repository and processing function (ARPF) entity, a security anchor function (SEAF) entity, and the like.

A main function of the RAN is controlling the user equipment to wirelessly connect to a mobile communications network. The RAN is a part of a mobile communications system, and implements a radio access technology. Conceptually, the RAN resides in a device (such as a mobile phone, a computer, or any remote control machine) and provides a connection to a core network thereof. A RAN device includes but is not limited to: an NR (new radio) in 5G, an evolved NodeB (eNB), a radio network controller (RNC), a NodeB (node B, NB), a base station controller (BSC), a base transceiver station (BTS), a home base station (for example, a home evolved NodeB or a home NodeB, HNB), a base band unit (BBU), a transmitting and receiving point (TRP), a transmitting point (TP), a mobile switching center, and the like. In addition, the RAN device may further include a wireless fidelity (Wi-Fi) access point (AP) and the like.

The AMF entity is responsible for access management and mobility management of the user equipment. In an actual application, the AMF entity includes a mobility management function of an MME in a 4G network architecture, and an access management function is added.

The SMF entity is responsible for session management, such as user session establishment.

The UPF entity is a user plane function network element and is mainly responsible for connecting to an external network. The UPF entity includes related functions of an S-GW and a P-GW in the 4G network architecture.

The DN is a network responsible for providing a service to the user equipment. For example, some DNs provide an internet access function to the user equipment, and other DNs provide an SMS message function to the user equipment, and the like.

The AUSF entity has an authentication server function and is configured to terminate an authentication function requested by the SEAF.

The UDM entity may store subscription information of the user equipment, and may implement a function similar to that of a backend of an HSS in 4G.

The ARPF entity has an authentication credential repository and processing function and is configured to store a long-term authentication credential of the user equipment, such as a permanent key K. In 5G, the function of the ARPF may be integrated into the UDM entity.

The SEAF entity is configured to complete a process of authenticating the user equipment. In 5G, the function of the SEAF may be integrated into the AMF entity.

For the user equipment, refer to the user equipment in the network architecture shown in FIG. 2.

The embodiments of this disclosure are applicable to both the 4G network architecture shown in FIG. 2 and the 5G network architecture shown in FIG. 3.

A charging trigger apparatus in the embodiments of this disclosure may be a policy and charging enforcement function (PCEF) in the P-GW shown in FIG. 2, or may be the SMF entity shown in FIG. 3. This is not limited in the embodiments of this disclosure.

Figure 4:
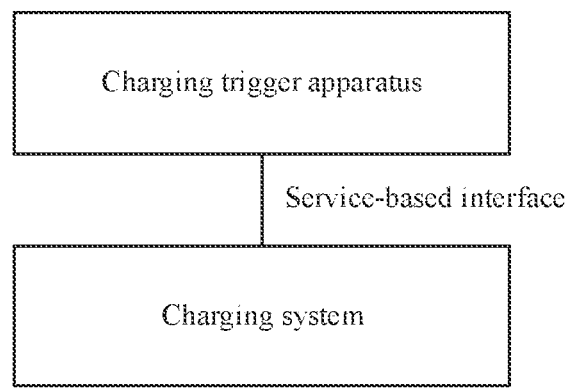
FIG. 4 is a schematic diagram of a charging architecture according to an embodiment of this disclosure.

FIG. 4 is a schematic diagram of a charging architecture according to an embodiment of this disclosure. The charging architecture includes a charging trigger apparatus and a charging system. The charging trigger apparatus and the charging system may communicate with each other by using a service-based interface, and the service-based interface is a resource-based capability exposure interface. A specific service-based interface may be a RESTful interface, a remote procedure call (RPC) interface, or the like.

The charging method according to an embodiment of this disclosure is described below in detail with reference to the charging architecture shown in FIG. 4.

Figure 5:
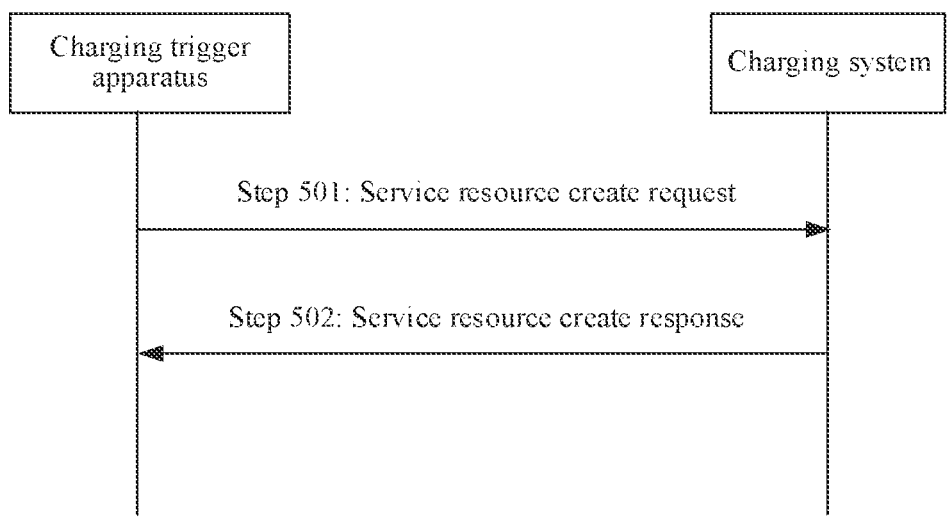
FIG. 5 is a schematic flowchart of a charging method according to an embodiment of this disclosure.

FIG. 5 is a schematic flowchart of a charging method according to an embodiment of this disclosure. The charging method includes the following steps.

Step 501: A charging trigger apparatus sends a service resource create request to a charging system, wherein the service resource create request is used to request the charging system to create a service resource corresponding to a service in a session, the session is used to provide a data connection service to user equipment, and the service resource is used to manage requesting for a quota for the service in the session and/or manage reporting of usage information of the service in the session.

It should be noted that when the charging method shown in FIG. 5 is applied to the 5G network architecture shown in FIG. 3, the session may be a packet data unit session (PDU session). The PDU session is a session between the user equipment and a data network, and is used to provide a data connection service to the user equipment; or when the charging method shown in FIG. 5 is applied to the 4G network architecture shown in FIG. 2 the session may be a IP-connectivity access network session (IP-CAN session). The IP-CAN session is a session between the user equipment and a P-GW and is used to provide a data connection service to the user equipment.

Specifically, in this embodiment of this disclosure, the charging trigger apparatus may be triggered, in the following manner, to send the service resource create request to the charging system: The charging trigger apparatus sends, according to a charging policy, the service resource create request to the charging system. The charging policy may be a local charging policy of the charging trigger apparatus, or may be sent by a charging policy apparatus to the charging trigger apparatus. For example, in the network architecture shown in FIG. 2, the charging policy apparatus may be the PCRF; or in the network architecture shown in FIG. 3, the charging policy apparatus may be a policy control function (PCF). For example, when the charging trigger apparatus needs to request a quota for the service in the session or report usage information of the service in the session and there is no available service resource, the charging trigger apparatus sends the service resource create request to the charging system. For another example, when the charging trigger apparatus determines to create a new session, and the session includes a service for which charging needs to be performed, the charging trigger apparatus sends the service resource create request to the charging system.

Step 502: After receiving the service resource create request sent by the charging trigger apparatus, the charging system sends a service resource create response to the charging trigger apparatus, where the service resource create response includes a first resource identifier, and the first resource identifier is used to identify the service resource that corresponds to the service in the session and that is created by the charging system.

In this embodiment of this disclosure, to help the charging system distinguish among service resources created for different sessions of different users, optionally, the service resource create request includes a session identifier and a user identifier corresponding to the user equipment, and the session identifier is used to identify the session. For example, if the session is a PDU session, the session identifier is an identifier (ID) of the PDU session. The user identifier may be an international mobile subscriber identity (IMSI), a user number (such as a mobile station international ISDN number (MSISDN)), a user internet protocol version 6 (IPv6) address, or the like.

The service resource create request is specifically described below.

Case 1: One service resource create request corresponds to one service resource, and the one service resource corresponds to one session.

In Case 1, the charging trigger apparatus sends a service resource create request to the charging system for one session, where the service resource create request is used to request the charging system to create a first service resource, and the first service resource corresponds to all services in the session. Specifically, all the services in the session are online charging services; or all the services in the session are offline charging services; or all the services in the session include both an online charging service and an offline charging service.

For example, in the network architecture shown in FIG. 3, assuming that there are three PDU sessions between the user equipment and the SMF entity, the charging trigger apparatus sends service resource create requests to the charging system for the three PDU sessions. To enable the charging system to distinguish among the different service resource create requests, each service resource create request includes a user identifier and a PDU session ID.

Case 2: One service resource create request corresponds to two service resources, wherein one service resource corresponds to an online charging service in a session, and the other service resource corresponds to an offline charging service in the session.

In Case 2, the charging trigger apparatus sends a service resource create request to the charging system for one session. The service resource create request is used to request the charging system to create a second service resource and a third service resource, wherein the second service resource corresponds to an online charging service in the session, and the third service resource corresponds to an offline charging service in the session.

During specific implementation, the charging system may identify the second service resource and the third service resource by using different resource identifiers.

Case 3: When the services in the session include an online charging service and an offline charging service, the charging trigger apparatus sends two service resource create requests to the charging system, wherein one service resource create request is used to request the charging system to create a service resource corresponding to the online charging service in the session, and the other service resource create request is used to request the charging system to create a service resource corresponding to the offline charging service in the session.

It should be noted that in Case 3, different attribute or identifier information may be used, so that the charging system can distinguish between the service resource create request used to request the charging system to create the service resource corresponding to the online charging service in the session and the service resource create request used to request the charging system to create the service resource corresponding to the offline charging service in the session.

Case 4: One service resource create request corresponds to a plurality of service resources, and the plurality of service resources corresponding to the service resource create request are service resources corresponding to services in one session.

A possible specific implementation is: The charging trigger apparatus sends a service resource create request to the charging system the service resource create request is used to create a plurality of service resources, and each service resource corresponds to a service, in the session, that belongs to a same rating group. For example, if one session includes a service belonging to a rating group 1 and a service belonging to a rating group 2, the charging trigger apparatus sends a service resource create request for the session. The service resource create request is used to request to create two service resources, one service resource corresponds to the rating group 1, and the other service resource corresponds to the rating group 2.

During specific implementation, the charging system may identify the service resources by using different resource identifiers.

It should be noted that in this embodiment of this disclosure, the service resource create request, without carrying any quota request information or any reported usage information, may be used to create a service resource, and the service resource is used to manage requesting for a quota for the service in the session and/or manage reporting of usage information of the service in the session. Specifically, requesting for a quota for an online charging service, reporting of usage information of an offline charging service, or requesting for a virtual quota for an offline charging service is subsequently completed through a service resource update operation.

In addition, in this embodiment of this disclosure, when the service corresponding to the service resource that the charging system is requested to create by the service resource create request includes an online charging service, the service resource create request may further include quota request information for the online charging service and a rating group corresponding to the quota request information.

In this embodiment of this disclosure, when the service corresponding to the service resource that the charging system is requested to create by the service resource create request includes an offline charging service, the service resource create request may further include a requested virtual quota for the offline charging service and a rating group corresponding to the requested virtual quota; or when the service corresponding to the service resource that the charging system is requested to create by the service resource create request includes an offline charging service, the service resource create request may further include usage information of the offline charging service and a rating group corresponding to the usage information.

In this embodiment of this disclosure, the quota request information for the online charging service and the rating group corresponding to the quota request information, the usage information of the offline charging service and the rating group corresponding to the usage information, and the requested virtual quota for the offline charging service and the rating group corresponding to the requested virtual quota, all of which are carried in the service resource create request, are identified by using different attributes or flags, so that the charging system can distinguish among them for processing.

The rating group is used to aggregate one or more services having a same charging rate, to help the charging system perform rating.

For example, when the service corresponding to the service resource that the charging system is requested to create by the service resource create request includes an online charging service and an offline charging service, optionally, the service resource create request may further include quota request information for the online charging service and a rating group corresponding to the quota request information, and usage information of the offline charging service and a rating group corresponding to the usage information. The charging trigger apparatus may distinguish, by using different attribute or flag information, between the quota request information for the online charging service and the rating group corresponding to the quota request information, and the usage information of the offline charging service and the rating group corresponding to the usage information. For example, a specific implementation of the service resource create request is shown in Table 1:

TABLE 1

Service Resource Create Request {
    user ID//User identifier
    PDU ID//Identifier of a session
    Resource info //
        {
            Rating group 1
            unit (type, value)//Requested quota type and quota amount for an online charging service
                type=1//Flag indicating that a quota is requested for the online charging service
        }
        {
            Rating group 2
            unit (type, value)//Usage type and usage amount of an offline charging service
            type=0//Flag indicating that usage information of the offline charging service is reported
        }
}

For another example, the service resource create request implemented by using a RESTful interface is shown in Table 2. In the service resource create request, the attribute "serviceResource" indicates the service resource and "subscriber IMSI" indicates the user identifier.

TABLE 2

```
POST  <server>/v1/<subscriber IMSI>/serviceResource
Content-Type: application/json
{
    "pdusessionID": "023152120",//Identifier of a session
    "serviceResource":'[{
        "opType":"Requested",//Flag indicating that a quota is requested for an online
charging service
        "ratingGroup":"001",//Rating group
        "unitType":"volume",//Requested quota type
        "units":"10"//Requested quota amount
    },
    }
        "opType":"Reported", //Flag indicating that usage information of an offline
charging service is reported
        "ratingGroup":"002",//Rating group
        "unitType":"volume",//Usage type of the offline charging service
        "units":"25"//Usage amount of the offline charging service
    }
  }
}
```

For example, when the service corresponding to the service resource that the charging system is requested to create by the service resource create request includes an online charging service and an offline charging service, optionally, the service resource create request may further include quota request information for the online charging service a rating group corresponding to the quota request information, a requested virtual quota for the offline charging service and a rating group corresponding to the requested virtual quota. A specific implementation of the service resource create request is shown in Table 3:

TABLE 3

```
Service Resource Create Request{
    user ID//User identifier
    PDU ID//Identifier of a session
    Resource info
        {
            Rating group 1
            unit (type, value)//Requested quota type and quota amount for an online
charging service
            type=1//Flag indicating that a quota is requested for the online charging service
        }
        {
            Rating group 2
            unit (type, value)//Requested virtual quota type and quota amount for an offline
charging service
            type=2//Flag indicating that a virtual quota is requested for the offline charging
service
        }
    }
```

Specifically, for the request for a quota for the online charging service, that the charging system reserves, from account balance of the user equipment, a quota that corresponds to the rating group and that is requested by using the service resource create request, and allocates the quota to the online charging service may be applied to a case in which the service resource create request further includes the quota request information for the online charging service and the rating group corresponding to the quota request information. For another example, for the request for a virtual quota for the offline charging service, that the charging system allocates, to the offline charging service, a virtual quota that corresponds to the rating group and that is requested by using the service resource create request, without reserving the virtual quota from account balance of the user equipment may be applied to a case in which the service resource create request further includes the requested virtual quota for the offline charging service and the rating group corresponding to the requested virtual quota. Alternatively, for another example, that the charging system generates a charging data record, based on the usage information of the offline charging service and the rating group corresponding to the usage information may be applied to a case in which the service resource create request further includes the usage information of the offline charging service and the rating group corresponding to the usage information.

For example, when the service resource create request is as shown in Table 2, the charging system reserves a quota of "10 M traffic volume" from the account balance for the online charging service whose user identifier is the IMSI, session identifier is "023152120", flag "opType" is "Requested", and rating group is "001"; and generates a charging data record with the usage information "25 M traffic volume" for the offline charging service whose user identifier is the IMSI, session identifier is "023152120", flag "opType" is "Reported", and rating group is "002".

It should be further noted that in this embodiment of this disclosure, the charging system may perform corresponding processing for the service resource create request according to a locally configured policy, or may perform corresponding processing for the service resource create request according to a configuration policy delivered by the charging policy apparatus such as the PCF.

In addition, if event-based charging needs to be performed for an event or an event group of a service, the charging system creates, based on a request of the charging trigger apparatus, a service resource corresponding to the event or the event group of the service, specifies a validity period for the service resource, subtracts, from a user account, charges spent by the service, and generates a resource identifier. The resource identifier is used to identify the service resource. If the service fails, the charging trigger apparatus sends a service resource delete request, and the service resource delete request includes the resource identifier and identification information instructing the charging system to return, to the user account, the charges that are spent by the service corresponding to the service resource identified by the resource identifier and that are subtracted from the user account. If the service succeeds, the charging trigger apparatus does not need to send the service resource delete request, and after the validity period expires, the charging system automatically deletes the service resource.

In this embodiment of this disclosure, in step 502, the service resource create response sent by the charging system to the charging trigger apparatus may further include a user identifier and a session identifier, so that the charging trigger apparatus can distinguish among services corresponding to the service resource identified by the first service resource identifier.

It should be noted that when the charging system has granted the quota to the online charging service, or has granted the virtual quota to the offline charging service, the service resource create response may further include granted quota information or granted virtual quota information.

offline charging service correspond to different attribute or flag information in the response message, so that the charging trigger apparatus can distinguish between them.

Optionally, the charging system may further generate a re-authentication trigger condition, and send the re-authentication trigger condition to the charging trigger apparatus, so that the charging trigger apparatus reports corresponding information when the re-authentication trigger condition is met. A specific re-authentication trigger condition may correspond to the service resource, or may correspond to a service corresponding to the service resource. The re-authentication trigger condition may alternatively be sent to the charging trigger apparatus by using the service resource create response. For example, the re-authentication trigger condition is that a usage amount of the online charging service is greater than or equal to the quota granted to the online charging service, or that the session is interrupted.

In addition, for the quota request information sent by the charging trigger apparatus, the charging system may further determine whether to grant the quota or whether to allow user equipment to directly use the service without any quota granted. If a determining result is that the service is an offline charging service that can be directly used without any quota granted, the service resource create response may further include an indication indicating that no granting needs to be performed. When the service, in the session, that belongs to a same rating group, corresponds to one service resource, if the charging system determines that the same rating group corresponds to both an actual quota and a virtual quota, the service resource create response further carries flow information corresponding to the granted quota (for example, a flow identifier or a flow feature information of the quota), so that the charging trigger apparatus separately manages, for the same rating group based on the flow identifier or the flow information, use of the actual quota and the virtual quota that are granted by the charging system.

For example, the service resource create response may be shown in Table 4.

TABLE 4

Service Resource Create Response{
    userID//User identifier
    Resource ID//Service resource identifier
    Resource Info//Granted quota information
        {
            Rating group 1//Rating group
            unit (type, value)//Granted quota type and quota amount
            resource update trigger//Re-authentication trigger condition
            type=1//Flag indicating that a quota is granted for an online charging service
        }
        {
            Rating group 2//Rating group
            unit (type, value)//Granted virtual quota type and quota amount
            type=2//Flag indicating a virtual quota is granted for an offline charging service
            resource update trigger//Re-authentication trigger condition
        }
}

During specific implementation, the quota granted to the online charging service and the virtual quota granted to the In another example, the service resource create response is shown in Table 5.

TABLE 5

200
Content-Type: application/json
{
    "id": "7b7181ae547aac1e01547efb61f20162",    //Service resource identifier
    "resultCode": "",//Response information TABLE 5-continued

```
    "resourceTimeOut": "",//Resource expiration time
    "serviceResource":'[{
            "opType":"Granted",//Flag indicating that a quota is granted
            "ratingGroup":"001",//Rating group
            "unitType":"volume",//Granted quota type
            "units":"10",//Granted quota amount
            "triggers":[{
                    "triggerType":""//Re-authentication trigger condition
                }
            ]
        }
    ]
}
```

It should be further noted that optionally, in this embodiment of this disclosure, if the charging system fails to create the service resource, the charging system sends a response indicating that the service resource fails to be created, to notify the charging trigger apparatus that the service resource fails to be created. In this case, to ensure successful use and charging of the service, the charging trigger apparatus may reseed the service resource create request to another charging system.

In addition, to ensure successful use of the service by the user and accuracy of charging for the service, the charging trigger apparatus sends a service resource update request to the charging system, the service resource update request includes a second resource identifier, and the second resource identifier is used to identify a service resource, in the service resource identified by the first resource identifier, that the charging system is requested to update. After receiving the service resource update request sent by the charging trigger apparatus, the charging system correspondingly updates the service resource based on the service resource update request.

It should be noted that the second resource identifier may be the first resource identifier, or may be an identifier of part of the resource identified by first resource identifier. Specifically, whether the second resource identifier is the first resource identifier or an identifier of part of the resource identified by first resource identifier may be determined by the charging system based on an actual case. For example, the first resource includes a service resource identified by a resource identifier 1 and a service resource identified by a resource identifier 2, if the service resource identified by the resource identifier 2 needs to be updated while the service resource identified by the resource identifier 1 remains unchanged, the second resource identifier is the resource identifier 2. For another example, when the first resource identifier is used to identify one service resource, and the service resource identified by the first resource identifier needs to be updated, the second resource identifier is the first resource identifier.

It should be understood that, during specific implementation, in example 1: when the service corresponding to the service resource identified by the second resource identifier includes an online charging service, the service resource update request may further include quota request information for the online charging service, a rating group corresponding to the quota request information, usage information of the online charging service and a rating group corresponding to the usage information. In this case, after receiving the service resource update request, the charging system may further reserve, from account balance of the user equipment, a quota that corresponds to the rating group and that is requested by using the service resource create request, allocates the quota to the online charging service, and subtract, from the quota allocated to the online charging service based on the usage information of the online charging service and the rating group corresponding to the usage information, a part used by the online charging service. Such technical solution may be applied to a case in which the granted quota of the online charging service in the session is used up.

In example 2, when the service corresponding to the service resource identified by the second resource identifier includes an online charging service, the service resource update request may further include quota request information for the online charging service and a rating group corresponding to the quota request information. In this case, after receiving the service resource update request, the charging system may further reserve, from account balance of the user equipment, a quota that corresponds to the rating group and that is requested by using the service resource create request, and allocates the quota to the online charging service. Such technical solution may be applied to a case in which there is a new online charging service having no granted quota in the session.

In example 3, when the service corresponding to the service resource identified by the second resource identifier includes an online charging service, the service resource update request may further include usage information of the online charging service and a rating group corresponding to the usage information. In this case, after receiving the service resource update request, the charging system may further subtract a part used by the online charging service from a quota allocated to the online charging service. Such technical solution may be applied to a case in which the granted quota of the online charging service in the session is not used up.

In example 4, when the service corresponding to the service resource identified by the second resource identifier includes an offline charging service, the service resource update request may further include a requested virtual quota for the offline charging service, a rating group corresponding to the requested virtual quota, usage information of the offline charging service and a rating group corresponding to the usage information. In this case, after receiving the service resource update request, the charging system may further allocate, to the offline charging service, a virtual quota that corresponds to the rating group and that is requested by using the service resource create request, and generate a charging data record based on the usage information of the offline charging service and the rating group corresponding to the usage information. Such technical solution may be applied to a case in which the granted virtual quota of the offline charging service in the session is used up.

In example 5, when the service corresponding to the service resource identified by the second resource identifier includes an offline charging service, the service resource update request may further include a requested virtual quota for the offline charging service and a rating group corresponding to the requested virtual quota. In this case, after receiving the service resource update request, the charging system may further allocate, to the offline charging service, a virtual quota that corresponds to the rating group and that is requested by using the service resource create request. Such technical solution may be applied to a case in which there is a new offline charging service having no granted virtual quota in the session.

In example 6, when the service corresponding to the service resource identified by the second resource identifier includes an offline charging service, the service resource create request may further include usage information of the offline charging service and a rating group corresponding to the usage information. In this case, after receiving the service resource update request, the charging system may further generate a charging data record based on the usage information of the offline charging service and the rating group corresponding to the usage information. Such technical solution may be applied to a case in which there is an offline charging service in the session.

It should be noted that technical solutions of example 1, example 2, example 3, example 4, example 5, and example 6 may be used together, and optionally, when the technical solution of example 6 is used, technical solutions of example 4 and example 5 may be interchanged for use, or the technical solution of example 4 may be interchanged for use, or the technical solution of example 5 may be interchanged for use.

online charging service, the usage information of the offline charging service and the rating group corresponding to the usage information of the offline charging service, and the requested virtual quota for the offline charging service and the rating group corresponding to the requested virtual quota, all of which are carried in the service resource create request, are identified by using different attribute or flag information, so that the charging system can distinguish among them for processing.

In addition, when the service resource update request includes the usage information (such as the usage information of the online charging service or the usage information of the offline charging service) of the service, the service resource update request may further include a reason fir reporting the usage information of the service, for example, the granted quota of the online charging service is used up, or the session is interrupted.

Specifically, when the service resource update request includes information such as the quota request information for the service or the usage information of the service, the information may be carried in a uniform resource locator (URL) of the service resource update request, or may be carried in a message header of the service resource update request, or may be carried in a message body of the service resource update request. The place where the information is carried is not limited in this disclosure.

In an example, a specific implementation of the service resource update request may be shown in Table 6.

TABLE 6

Service Resource Update Request {
    userID//User identifier
    resource ID//Second resource identifier
    resource info
        {
            Rating group 1//Rating group
            unit (type, value)//Usage type and usage amount of an online charging service
            type=3//Flag indicating that usage information of the online charging service is
reported
        }
        {
            Rating group 1//Rating group
            unit (type, value)//Quota type and quota amount
            type=1//Flag indicating that a new quota is requested for a charging service
        }
        {
            Rating group 1//Rating group
            unit (type, value)//Usage type and usage amount of an offline charging service
            type=0//Flag indicating that usage information of the offline charging service is
reported
        }
}

In this embodiment of this disclosure, the quota request information for the online charging service and the rating group corresponding to the quota request information, the usage information of the online charging service and the rating group corresponding to the usage information of the For another example, the service resource update request implemented by using the RESTful interface is shown in Table 7. In the service resource update request, the attribute "serviceResource" indicates the service resource and "subscriber" indicates a user.

TABLE 7

PATCH <server>/v1/subscriber/serviceResource/<Resource id>
Content-Type: application/json
{
    "serviceResource":'[{
        "opType":"Used",//Flag indicating that uage information of an online charging
service is reported TABLE 7-continued

```
        "ratingGroup":"001",//Rating group
        "unitType";"volume",//Usage type of an online charging service
        "units":"8"//Usage amount of the online charging service
    },
    {
        "opType":"VirtualUsed",//Flag indicating that usage information of an offline
charging service with a virtual quota granted is reported
        "ratingGroup":"001",//Rating group
        "unitType":"volume",//Usage type of an offline charging service
        "units":"8"//Usage amount of the offline charging service
    },
    {
        "opType":"Requested",//Flag indicating that a new quota is requested for the
online charging service
        "ratingGroup":"001",//Rating group
        "unitType":"volume",//Quota type
        "units":"10",//Quota amount
        "reportingReason":""//Reason for reporting
    },
    {
        "opType":"Reported",//Flag indicating that usage information of an offline
charging service is reported
        "ratingGroup":"002",//Rating group
        "unitType":"volume",//Usage type of an offline charging service
        "units":"10"//Usage amount of the offline charging service
    }
    ]
}
```

Specifically, this embodiment of this disclosure further provides a manner of triggering the charging trigger apparatus to send the service resource update request to the charging system:

A possible triggering manner is: When a first trigger condition is met, the charging trigger apparatus sends the service resource update request to the charging system. For example, the first charging trigger condition may be that the charging trigger apparatus determines that the quota granted to the online charging service is used up. For another example, the first charging trigger condition is the re-authentication condition delivered by the charging system. For still another example, the first charging trigger condition is that a status of the service satisfies a preconfigured reporting condition (for example, the service is ended or a network type is changed).

Another possible trigger manner is: The charging system sends a service resource update notification to the charging trigger apparatus, the notification includes a third resource identifier, and the third resource identifier is used to identify a service resource, in the service resource identified by the first resource identifier, that the charging system requests to be updated. After receiving the service resource update notification, the charging trigger apparatus reports the service resource update request to the charging system. The service resource update request includes the second resource identifier, and the second resource identifier may be the third resource identifier; or may include the third service resource identifier and an identifier of another to-be-updated service resource determined by the charging trigger apparatus.

Further, the service resource update notification further includes a rating group to which a service for which the charging system requests a service resource to be updated belongs, and the service is in the services corresponding to a service resource identified by the third resource identifier.

For example, a possible implementation of the service resource update notification is shown in Table 8.

TABLE 8

Service Resource Update Notify. {
    userID//User identifier
    resource ID//Resource identifier
    Rating group 1
}

For example, the service resource update notification implemented by using the RESTful interface is shown in Table 9, the attribute "subscriber" indicates the user and "pdusessionID" indicates the session identifier.

TABLE 9

POST <server>/v1/subscriber/<pdusessionID>
Content-Type: application/json
{
    "relatedServiceResource":"7b7181ae547aac1e01547efb61f20162"//Resource identifier
    "ratingGroup":"",//Rating group
}

In this embodiment of this disclosure, after updating the corresponding service resource based on the service resource update request, the charging system may further return a service resource update response to the charging trigger apparatus. Specifically, the service resource update response is used to indicate, to the charging trigger apparatus, whether the charging system has updated the service resource.

Optionally, the service resource update response may further include information such as the quota granted to the online charging service or the virtual quota granted to the offline charging service. When the service resource update response includes both the quota granted to the online charging service and the virtual quota granted to the offline charging service, the quota granted to the online charging service and the virtual quota granted to the offline charging service correspond to different flags or attributes, so that the charging trigger apparatus can distinguish between them.

In an example, a possible implementation of the service resource update response may be shown in Table 10.

TABLE 10

```
Service Resource Update Response{
    userID//User identifier
    resource ID//Resource identifier
    resource info
        {
            Rating group 1
            unit (type, value)//Granted quota type and quota amount
            type=3//Flag indicating that a quota is granted for an online charging service
        }
}
```

For another example, the service resource update response implemented by using the RESTful interface is shown in Table 11. In the service resource update response, the attribute "serviceResource" indicates the service resource and "subscriber" indicates the user.

TABLE 11

```
200
Content-Type: application/json
{
    "id": "7b7181ae547aac1e01547efb61f20162",//Service resource identifier
    "resultCode": "",//Response information
    "serviceResource":'[{
        "opType":" Granted",//Flag indicating that a quota is granted for an online service
        "ratingGroup":"001",//Rating group
        "unitType":"volume",//Granted quota type
        "units":"8"//Granted quota amount
        }
    ]
}
```

To improve resource utilization ratio in the charging system, optionally, when a second charging trigger condition is met, the charging trigger apparatus sends a service resource delete request to the charging system, the service resource delete request includes a fourth resource identifier, and the fourth resource identifier is used to identify a service resource to be deleted from the service resource identified by the first resource identifier. After receiving the service resource delete request, the charging system deletes the service resource identified by the fourth resource identifier.

It should be noted that the second charging trigger condition may be sent by the charging policy apparatus to the charging trigger apparatus, or may be a policy configured by the charging trigger apparatus locally. For example, the second charging trigger condition is that a service corresponding to the service resource is interrupted, or the session is ended.

During specific implementation, when the service corresponding to the service resource identified by the fourth resource identifier includes an online charging service, the service resource delete request may further include usage information of the online charging service and a rating group corresponding to the usage information. In this case, the charging system subtracts, from a quota for the online charging service based on the usage information of the online charging service and the rating group corresponding to the usage information, a part used by the online charging service. Such subtraction may be applied to a case in which the service resource delete request further includes the usage information of the online charging service and the rating group corresponding to the usage information. When the service corresponding to the service resource identified by the fourth resource identifier includes an offline charging service, the service resource delete request may further include usage information of the offline charging service and a rating group corresponding to the usage information. In this case, the charging system generates a charging data record based on the usage information of the offline charging service and the rating group corresponding to the usage information, and such technical solution may be applied to a case in which the service resource delete request further includes the usage information of the offline charging service and the rating group corresponding to the usage information.

When the service resource delete request includes usage information of a service (such as usage information of an online charging service or usage information of an offline charging service) the service resource delete request may include a reason for reporting the usage information of the service.

Specifically, the foregoing content may be carried in a URL of the service resource delete request, or may be carried in a message header of the service resource delete request, or may be carried in a message body of the service resource delete request.

It should be understood that, different content, such as the usage information of the online charging service or the usage information of the offline charging service, included in the service resource delete request may be identified by using different or flag information, so that the charging system can distinguish among them for processing.

Alternatively, when a service resource corresponding to an online charging service is different from a service resource corresponding to an offline charging service, different service resource delete requests may be used to request the charging system to delete the service resource corresponding to the online charging service and the service resource corresponding to the offline charging service. In the case when a service resource delete request includes usage information of a service, usage information of an online charging service and usage information of an offline charging service may be carried in different service resource delete requests.

In an example, a possible implementation of the service resource delete request may be shown in Table 12.

TABLE 12

```
Service Resouce Delete Request {
    userID
    resource ID
    resource info
        {
            Rating group 1
            unit (type, value)//Usage type and usage amount
            type=3//Flag indicating that usage information of an online charging service
with a quota granted is reported
        }
        {//
            Rating group 2
            unit (type, value)//Usage type and usage amount
            type=0//Flag indicating that usage information of an offline charging service is
reported
        }
}
```

For another example, the service resource delete request implemented by using the RESTful interface is shown in Table 13. In the service resource delete request, the attribute "serviceResource" indicates the service resource and "subscriber" indicates the user.

TABLE 13

```
DELETE <server>/v1/subscriber/serviceResource/<Resource id>
Content-Type: application/json
{
    "serviceResource":'[{
            "opType":"Used",//Flag indicating that usage information information of an
online charging service with a quota granted is reported
            "ratingGroup":"001",//Rating group
            "unitType":"volume",//Used quota type
            "units":"8"//Used quota amount
            "reportingReason":""//Reason for reporting
        },
        {
            "opType":"Reported",//Flag indicating that usage information of an offline
charging service is reported
            "ratingGroup":"002",//Rating group
            "unitType":"volume",//Usage type
            "unite":"10"//Usage amount
            "reportingReason":""//Reason for reporting
        }
    ]
}
```

In this embodiment of this disclosure, after the charging system deletes the service resource based on the service resource delete request, optionally, the charging system may further send a service resource delete response to the charging trigger apparatus, and the service resource delete response is used to notify the charging trigger apparatus of the deleted service resource.

In embodiments of this disclosure, different messages, such as the service resource create request, the service resource update request, and the service resource delete request, may be distinguished by a name of a hypertext transfer protocol (HTTP) method, a name of an application programming interface (API), a specific identifier in an API, or the like, used by an application.

The solutions provided in this disclosure are mainly described above from a perspective of interaction between network elements. It can be understood that, to implement the foregoing functions, the network elements include corresponding hardware structures and/or software modules for performing the functions. A person of ordinary skill in the art should easily be aware that, in combination with the example units, algorithms, and steps described in the embodiments disclosed in this disclosure, this disclosure may be implemented by using hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

Figure 6:
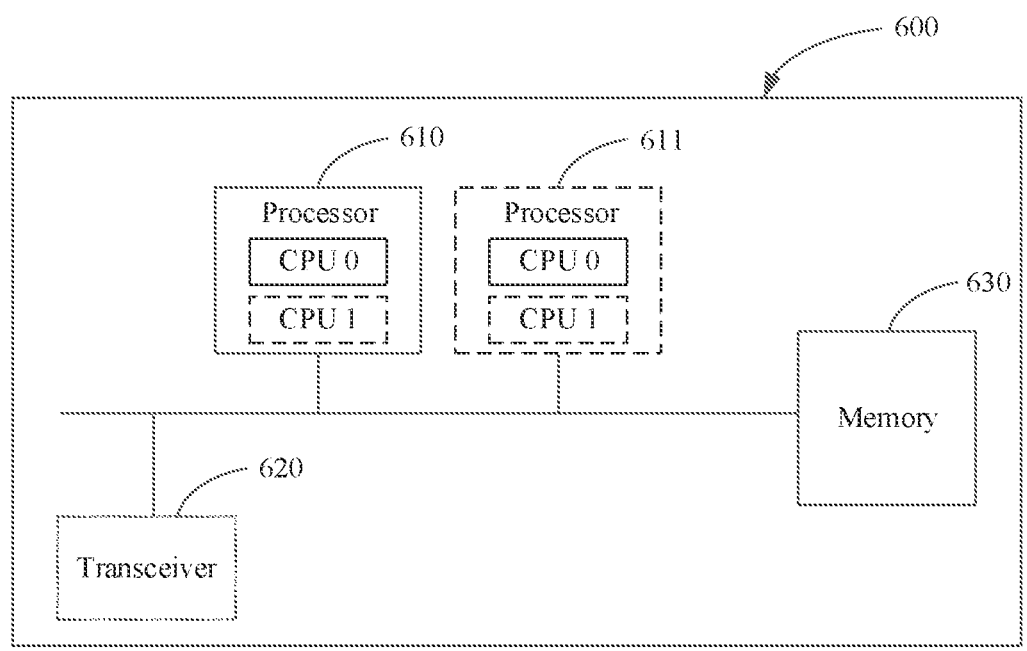
FIG. 6 is a schematic diagram of a charging trigger apparatus according to an embodiment of this disclosure.

Based on a same concept, FIG. 6 is a schematic diagram of a charging trigger apparatus 600 according to this disclosure. The charging trigger apparatus may be a network device, or may be a chip or a system on chip in a network device, and may perform the method performed by the charging trigger apparatus in the embodiment shown in FIG. 5.

The charging trigger apparatus 600 includes at least one processor 610 and a memory 630.

The memory 630 is configured to store a program. The memory 630 may be a ROM, another type of static storage device, such as a RAM, that can store static information and an instruction, or another type of dynamic storage device that can store information and an instruction; or may be an electrically erasable programmable read-only memory (EEPROM), a compact disc read-only memory (CD-ROM) or another compact disc storage, a disc storage (including a compact disc, a laser disc, an optical disc, a digital versatile disc, a Blu-ray disc, or the like), a magnetic disk storage medium or another magnetic disk storage device, or any other medium that can be configured to carry or store an expected program in a form of an instruction or a data structure and that can be accessed by a computer. However, this disclosure is not limited thereto. The memory 630 may exist independently and is connected to the processor 610. Alternatively, the memory 630 may be integrated with the processor 610.

The processor 610 is configured to execute the program in the memory 630, to implement the steps performed by the charging trigger apparatus in the charging method in the embodiments of this disclosure. For related features, refer to the foregoing descriptions, and details are not described herein again. For example, the processor 610 may be a general-purpose CPU, a microprocessor, an ASIC, or one or more integrated circuits that are configured to control execution of the program of the technical solutions of this disclosure.

During specific implementation, in an embodiment, the processor 610 may include one or more CPUs, for example, a CPU 0 and a CPU 1 in FIG. 6.

During specific implementation, in an embodiment, the charging trigger apparatus 600 may include a plurality of processors, for example, a processor 610 and a processor 611 in FIG. 6. Each of the processors may be a single-core (single-CPU) processor, or may be a multi-core (multi-CPU) processor. The processor herein may be one or more devices, a circuit, and/or a processing core configured to process data (for example, a computer program instruction).

Optionally, when the charging trigger apparatus 600 is a terminal device, the charging trigger apparatus 600 may further include a transceiver 620 shown in FIG. 6, the transceiver 620 is configured to communicate with another device or a communications network, and the transceiver 620 includes a radio frequency circuit. In the terminal device, the processor 610, the transceiver 620, and the memory 630 may be connected by using a communications bus. The communications bus may include a path for information transmission between the foregoing units. When the charging trigger apparatus 600 is a chip or a system on chip in a network device, the processor 610 may send or receive data by using an input/output interface, a pin, a circuit, or the like.

Figure 7:
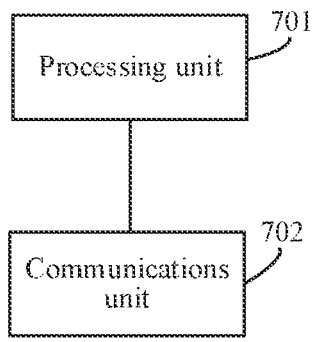
FIG. 7 is a schematic diagram of a charging trigger apparatus according to an embodiment of this disclosure.

FIG. 7 is a schematic diagram of another charging trigger apparatus according to an embodiment of this disclosure. The apparatus may be a network device, or may be a chip or a system on chip in a network device, and may perform the method performed by the charging trigger apparatus in the embodiment shown in FIG. 5.

The apparatus includes a processing unit 701 and a communications unit 702.

The processing unit 701 is configured to generate a service resource create request; and the communications unit 702 is configured to: send the service resource create request to a charging system, and then receive a service resource create response sent by the charging system. The service resource create request is used to request the charging system to create a service resource corresponding to a service in a session, the session is used to provide a data connection service to user equipment, the service resource is used to manage requesting for a quota for the service in the session and/or manage reporting of usage information of the service in the session, the service resource create response includes a first resource identifier, and the first resource identifier is used to identify the service resource that corresponds to the service in the session and that is created by the charging system.

Optionally, when a quota needs to be requested or usage information needs to be reported for the service in the session and there is no available service resource, the communications unit 702 is configured to send the service resource create request to the charging system.

Optionally, the service resource create request includes a session identifier and a user identifier corresponding to the user equipment, and the session identifier is used to identify the session.

Optionally, the service resource create request is used to request the charging system to create a first service resource, and the first service resource corresponds to all services in the session. All the services in the session are online charging services; or all the services in the session are offline charging services; or all the services in the session include an online charging service and an offline charging service.

Optionally, the service resource create request is used to request the charging system to create a second service resource and a third service resource, where the second service resource corresponds to an online charging service in the session, and the third service resource corresponds to an offline charging service in the session. Alternatively, in a possible design, the service resource create request is used to request the charging system to create a service resource corresponding to an online charging service in the session. Alternatively, in a possible design, the service resource create request is used to request the charging system to create a service resource corresponding to an offline charging service in the session.

Optionally, the service resource create request is used to request the charging system to create at least one service resource, and each of the at least one service resource corresponds to a service, in the session, that belongs to a same rating group.

Optionally, when the service corresponding to the service resource that the charging system is requested to create by the service resource create request includes an online charging service, the service resource create request further includes quota request information for the online charging service and a rating group corresponding to the quota request information; or when the service corresponding to the service resource that the charging system is requested to create by the service resource create request includes an offline charging service, the service resource create request further includes a requested virtual quota for the offline charging service and a rating group corresponding to the requested virtual quota; or when the service corresponding to the service resource that the charging system is requested to create by the service resource create request includes an offline charging service, the service resource create request further includes usage information of the offline charging service and a rating group corresponding to the usage information.

Optionally, the communications unit 702 is further configured to send a service resource update request to the charging system. The service resource update request includes a second resource identifier, and the second resource identifier is used to identify a service resource, in the service resource identified by the first resource identifier, that the charging system is requested to update.

Optionally, when the service corresponding to the service resource identified by the second resource identifier include an online charging service, the service resource update request further includes quota request information for the online charging service, a rating group corresponding to the quota request information, usage information of the online charging service and a rating group corresponding to the usage information; or when the service corresponding to the service resource identified by the second resource identifier include an online charging service, the service resource update request further includes quota request information for the online charging service and a rating group corresponding to the quota request information; or when the service corresponding to the service resource identified by the second resource identifier includes an online charging service, the service resource update request further includes usage information of the online charging service and a rating group corresponding to the usage information; or when the service corresponding to the service resource identified by the second resource identifier includes an offline charging service, the service resource update request further includes a requested virtual quota for the offline charging service, a rating group corresponding to the requested virtual quota, usage information of the offline charging service and a rating group corresponding to the usage information; or when the service corresponding to the service resource identified by the second resource identifier includes an offline charging service, the service resource update request further includes a requested virtual quota for the offline charging service and a rating group corresponding to the requested virtual quota; or when the service corresponding to the service resource identified by the second resource identifier includes an offline charging service, the service resource update request further includes usage information of the offline charging service and a rating group corresponding to the usage information.

Optionally, the communications unit 702 is configured to: after receiving a service resource update notification sent by the charging system, send the service resource update request to the charging system. Optionally, the service resource update notification includes a third resource identifier, and the third resource identifier is used to identify a service resource, in the service resource identified by the first resource identifier, that the charging system requests to be updated.

Further, optionally, the service resource update request further includes a rating group to which a service for which the charging system requests a service resource to be updated belongs, and the service is in the services corresponding to a service resource identified by the third resource identifier.

Optionally, the communications unit 702 is configured to send the service resource update request to the charging system.

Optionally, the communications unit 702 is further configured to send a service resource delete request to the charging system. The service resource delete request includes a fourth resource identifier, and the fourth resource identifier is used to identify a service resource to be deleted from the service resource identified by the first resource identifier.

Optionally, when the service corresponding to the service resource identified by the fourth resource identifier includes an online charging service, the service resource delete request further includes usage information of the online charging service and a rating group corresponding to the usage information; or when the service corresponding to the service resource identified by the fourth resource identifier includes an offline charging service, the service resource delete request further includes usage information of the offline charging service and a rating group corresponding to the usage information.

It should be understood that the charging trigger apparatus may be configured to implement the steps performed by the charging trigger apparatus in the charging method in the embodiments of this disclosure. For related features, refer to the foregoing descriptions, and details are not described herein again.

Figure 8:
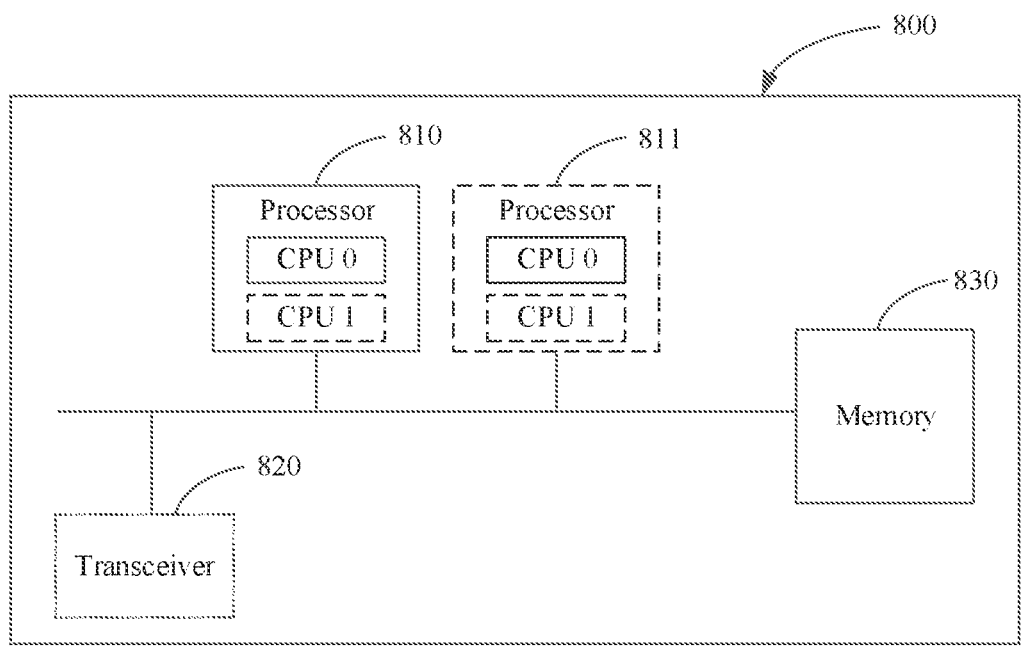
FIG. 8 is a schematic diagram of a charging system according to an embodiment of this disclosure.

Based on a same concept, FIG. 8 is a schematic diagram of a charging system 800 according to this disclosure. The charging system may be a network device, or may be a chip or a system on chip in a network device, and may perform the method performed by the charging system in the embodiment shown in FIG. 5.

The charging system 800 includes at least one processor 810 and a memory 830.

The memory 830 is configured to store a program. The memory 830 may be a ROM, another type of static storage device, such as a RAM, that can store static information and an instruction, or another type of dynamic storage device that can store information and an instruction; or may be an EEPROM, a CD-ROM or another compact disc storage, a disc storage (including a compact disc, a laser disc, an optical disc, a digital versatile disc, a Blu-ray disc, or the like), a magnetic disk storage medium or another magnetic disk storage device, or any other medium that can be configured to carry or store an expected program in a form of an instruction or a data structure and that can be accessed by a computer. However, this disclosure is not limited thereto. The memory 830 may exist independently and is connected to the processor 810. Alternatively, the memory 830 may be integrated with the processor 810.

The processor 810 is configured to execute the program in the memory 830, to implement the steps performed by the charging system in the charging method in the embodiments of this disclosure. For related features, refer to the foregoing descriptions, and details are not described herein again. For example, the processor 810 may be a general-purpose CPU, a microprocessor, an ASIC, or one or more integrated circuits that are configured to control execution of the program of the technical solutions of this disclosure.

During specific implementation, in an embodiment, the processor 810 may include one or more CPUs, for example, a CPU 0 and a CPU 1 in FIG. 8.

During specific implementation, in an embodiment, the charging system communications apparatus 800 may include a plurality of processors, for example, a processor 810 and a processor 811 in FIG. 8. Each of the processors may be a single-core (single-CPU) processor, or may be a multi-core (multi-CPU) processor. The processor herein may be one or more devices, a circuit, and/or a processing core configured to process data (for example, a computer program instruction).

Optionally, when the charging system 800 is a network device, the charging system 800 may further include a transceiver 820 shown in FIG. 8, the transceiver 820 is configured to communicate with another device or a communications network, and the transceiver 820 includes a radio frequency circuit. In the network device, the processor 810, the transceiver 820, and the memory 830 may be connected by using a communications bus. The communications bus may include a path for information transmission between the foregoing units. When the charging system 800 is a chip or a system on chip in a network device, the processor 810 may send or receive data by using an input/output interface, a pin, a circuit, or the like.

Figure 9:
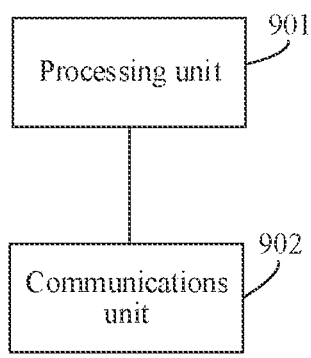
FIG. 9 is a schematic diagram of a charging system according to an embodiment of this disclosure.

FIG. 9 is a schematic diagram of another charging system according to an embodiment of this disclosure. The charging system may be a network device, or may be a chip or a system on chip in a network device, and may perform the method performed by the charging system in the embodiment shown in FIG. 5.

The charging system includes a processing unit 901 and a communications unit 902.

The communications unit 902 is configured to receive a service resource create request sent by a charging trigger apparatus; then the processing unit 901 is configured to: after the communications unit 902 receives the service resource create request, generate a service resource create response; and the communications unit 902 is further configured to send the service resource create response to the charging trigger apparatus. The service resource create request is used to request the charging system to create a service resource corresponding to a service in a session, the session is used to provide a data connection service to user equipment, and the service resource is used to manage requesting for a quota for the service in the session and/or manage reporting of usage information of the service in the session. The service resource create response includes a first resource identifier, and the first resource identifier is used to identify the service resource that corresponds to the service in the session and that is created by the charging system.

Optionally, the service resource create request includes a session identifier and a user identifier corresponding to the user equipment, and the session identifier is used to identify the session. This technical solution helps the charging system be able to distinguish among different types of services of different users when performing service charging.

Optionally, the service resource create request is used to request the charging system to create a first service resource, and the first service resource corresponds to all services in the session. All the services in the session are online charging services; or all the services in the session are offline charging services; or all the services in the session include an online charging service and an offline charging service.

Optionally, the service resource create request is used to request the charging system to create a second service resource and a third service resource, where the second service resource corresponds to an online charging service in the session, and the third service resource corresponds to an offline charging service in the session. Alternatively, in a possible design, the service resource create request is used to request the charging system to create a service resource corresponding to an online charging service in the session. Alternatively, in a possible design, the service resource create request is used to request the charging system to create a service resource corresponding to an offline charging service in the session.

Optionally, the service resource create request is used to request the charging system to create at least one service resource, and each of the at least one service resource corresponds to a service, in the session, that belongs to a same rating group.

Optionally, when the service corresponding to the service resource that the charging system is requested to create by the service resource create request includes an online charging service, the service resource create request further includes quota request information for the online charging service and a rating group corresponding to the quota request information; or when the service corresponding to the service resource that the charging system is requested to create by the service resource create request includes an offline charging service, the service resource create request further includes a requested virtual quota for the offline charging service and a rating group corresponding to the requested virtual quota; or when the service corresponding to the service resource that the charging system is requested to create by the service resource create request includes an offline charging service, the service resource create request further includes usage information of the offline charging service and a rating group corresponding to the usage information.

Optionally, the communications unit 902 is further configured to receive a service resource update request sent by the charging trigger apparatus, and the processing unit 901 is further configured to update, based on the service resource update request, a service resource corresponding to a second resource identifier. The service resource update request includes the second resource identifier, and the second resource identifier is used to identify a service resource, in the service resource identified by the first resource identifier, that the charging system is requested to update. This technical solution helps further improve accuracy of service charging performed by the charging system.

Optionally, when the service corresponding to the service resource identified by the second resource identifier includes an online charging service, the service resource update request further includes quota request information for the online charging service, a rating group corresponding to the quota request information, usage information of the online charging service and a rating group corresponding to the usage information; or when the service corresponding to the service resource identified by the second resource identifier includes an online charging service, the service resource update request further includes quota request information for the online charging service and a rating group corresponding to the quota request information; or when the service corresponding to the service resource identified by the second resource identifier includes an online charging service, the service resource update request further includes use information of the online charging service and a rating group corresponding to the online charging service;

when the service corresponding to the service resource identified by the second resource identifier includes an offline charging service, the service resource update request further includes a requested virtual quota for the offline charging service, a rating group corresponding to the requested virtual quota, usage information of the offline charging service and a rating group corresponding to the usage information; or when the service corresponding to the service resource identified by the second resource identifier includes an offline charging service, the service resource update request further includes a requested virtual quota for the offline charging service and a rating group corresponding to the requested virtual quota; or when the service corresponding to the service resource identified by the second resource identifier includes an offline charging service, the service resource update request further includes usage information of the offline charging service and a rating group corresponding to the usage information.

Optionally, the communications unit 902 is further configured to: after sending a service resource update notification to the charging trigger apparatus, receive the service resource update request sent by the charging trigger apparatus. The service resource update notification includes a third resource identifier, and the third resource identifier is used to identify a service resource, in the service resource identified by the first resource identifier, that the charging system requests to be updated.

Further, optionally, the service resource update request further includes a rating group to which a service for which the charging system requests a service resource to be updated belongs, and the service is in the services corresponding to a service resource identified by the third resource identifier.

Optionally, the communications unit 902 is further configured to receive a service resource delete request sent by the charging trigger apparatus, and the processing unit 901 is further configured to delete, based on the service resource delete request, a service resource identified by a fourth resource identifier. The service resource delete request includes the fourth resource identifier, and the fourth resource identifier is used to identify a service resource to be deleted from the service resource identified by the first resource identifier. The foregoing manner helps the charging system release the created service resource, to improve resource utilization in the charging system.

Optionally, when the service corresponding to the service resource identified by the fourth resource identifier includes an online charging service, the service resource delete request further includes usage information of the online charging service and a rating group corresponding to the usage information; or when the service corresponding to the service resource identified by the fourth resource identifier includes an offline charging service, the service resource delete request further includes usage information of the offline charging service and a rating group corresponding to the usage information.

It should be understood that the charging system may be configured to implement the steps performed by the charging system in the charging method in the embodiments of this disclosure. For related features, refer to the foregoing descriptions, and details are not described herein again.

It should be understood that the division manner of the modules in the charging trigger apparatus and the charging system shown in FIG. 7 and FIG. 9 is only an example, and is merely logical function division. There may be another division manner during actual implementation. For example, the communications unit is divided into a receiving unit and a sending unit.

Figure 10:
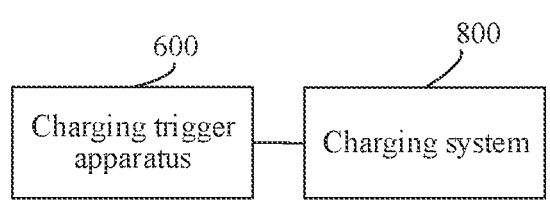
FIG. 10 is a schematic diagram of a communications system according to an embodiment of this disclosure.

As shown in FIG. 10, an embodiment of this disclosure further provides a communications system, and the communications system includes the charging trigger apparatus 600 and the charging system 800.

All or some of the foregoing embodiments may be implemented by using software, hardware, firmware, or any combination thereof. When software is used to implement the embodiments, the embodiments may be all or partially implemented in a form of a computer program product. The computer program product includes one or more computer instructions. When the computer instructions are loaded and executed on a computer, the procedures or functions according to the embodiments of this disclosure are all or partially generated. The computer may be a general-purpose computer, a dedicate computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Although this disclosure is described with reference to the embodiments, in a process of implementing this disclosure that claims protection, a person skilled in the art may understand and implement other variations of the disclosed embodiments by viewing the accompanying drawings, the disclosed content, and the appended claims. In the claims, "comprising" does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce a better effect.

A person skilled in the art should understand that the embodiments of this disclosure may be provided as a method, an apparatus (device), a computer-readable storage medium, or a computer program product. Therefore, this disclosure may use a form of hardware only embodiments, software only embodiments, or embodiments with a combination of software and hardware. They are collectively referred to as "modules" or "systems".

This disclosure is described with reference to the flowcharts and/or block diagrams of the method, the apparatus (device), and the computer program product in this disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may also be stored in a computer-readable memory that can instruct the computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although this disclosure is described with reference to specific features and the embodiments thereof, obviously, various modifications and combinations may be made to them without departing from the scope of this disclosure. Correspondingly, the specification and accompanying drawings are merely example description of this disclosure defined by the accompanying claims, and are considered as any of or all modifications, variations, combinations or equivalents that cover the scope of this disclosure. Obviously, a person skilled in the art can make various modifications and variations to this disclosure without departing from the scope of this disclosure. This disclosure is intended to cover these modifications and variations of this disclosure provided that they fall within the scope of protection defined by the following claims and their equivalent technologies.

What is claimed is:

1. A charging method, comprising:
    sending, by a charging trigger apparatus, a resource create request to a charging system, wherein the resource create request is used to request the charging system to create a resource for a session between a user equipment and a data network; and
    receiving, by the charging trigger apparatus, a resource create response from the charging system, wherein the resource create response comprises a first resource identifier that is used to identify the resource;
    wherein the resource is used to manage at least one of:
        requesting for a quota for an online charging service in the session,
        reporting of usage information of an online charging service in the session, or
        reporting of usage information of an offline charging service in the session.

2. The charging method according to claim 1, wherein the sending, by a charging trigger apparatus, a resource create request to a charging system comprises:
    when there is no available resource, sending, by the charging trigger apparatus, the resource create request to the charging system.

3. The charging method according to claim 1, wherein the resource create request comprises a session identifier and a user identifier corresponding to the user equipment, and wherein the session identifier is used to identify the session.

4. The charging method according to claim 1, wherein the resource create request comprises at least one of:
    quota request information for an online charging service and a rating group corresponding to the quota request information; or
    usage information, indication information and a rating group corresponding to the usage information, wherein the indication information indicates that the usage information is that of an offline charging service.

5. The charging method according to claim 1, further comprising:
    sending, by the charging trigger apparatus, a resource update request to the charging system, wherein the resource update request comprises a second resource identifier, and the second resource identifier is the first resource identifier.

6. The charging method according to claim 5, wherein:
    the resource update request further comprises at least one of the following:
        quota request information for an online charging service, and a rating group corresponding to the quota request information; or
        first usage information, first indication information and a rating group corresponding to the first usage information, wherein the first indication information indicates that the first usage information is that of an online charging service; or
        second usage information, second indication information and a rating group corresponding to the second usage information, wherein the second indication information indicates that the second usage information is that of an offline charging service.

7. The charging method according to claim 5, wherein the resource update request comprises usage information and indication information indicating that the usage information is that of an online charging service or an offline charging service.

8. The charging method according to claim 1, further comprising:
    sending, by the charging trigger apparatus, a resource delete request to the charging system, wherein the resource delete request comprises a fourth resource identifier, wherein the fourth resource identifier is the first resource identifier.

9. The charging method according to claim 8, wherein the resource delete request further comprises at least one of the following:
    first usage information, first indication information and a rating group corresponding to the first usage information, wherein the first indication information indicates that the first usage information is that of an online charging service; or
    second usage information, second indication information and a rating group corresponding to the second usage information, wherein the second indication information indicates that the second usage information is that of an offline charging service.

10. The charging method according to claim 8, wherein the resource delete request comprises usage information and indication information indicating that the usage information is that of an online charging service or an offline charging service.

11. The charging method according to claim 1, wherein the resource create request comprises usage information and indication information indicating that the usage information is that of an online charging service or an offline charging service.

12. A charging method, comprising:
    receiving, by a charging system, a resource create request sent by a charging trigger apparatus, wherein the resource create request is used to request the charging system to create a resource for a session between a user equipment and a data network; and
    sending, by the charging system, a resource create response to the charging trigger apparatus, wherein the resource create response comprises a first resource identifier that is used to identify the resource created by the charging system in response to the resource create request;

wherein the resource is used to manage at least one of:
- requesting for a quota for an online charging service in the session,
- reporting of usage information of an online charging service in the session, or
- reporting of usage information of an offline charging service in the session.

13. The charging method according to claim 12, wherein the resource create request comprises at least one of:
- quota request information for an online charging service and a rating group corresponding to the quota request information; or
- usage information, indication information and a rating group corresponding to the usage information, wherein the indication information indicates that the usage information is that of an offline charging service.

14. The charging method according to claim 12, wherein the charging method further comprises:
- receiving, by the charging system, a resource update request sent by the charging trigger apparatus, wherein the resource update request comprises a second resource identifier, and the second resource identifier is the first resource identifier; and
- updating, by the charging system based on the resource update request, the resource.

15. The charging method according to claim 14, wherein:
the resource update request further comprises at least one of the following:
- quota request information for an online charging service, and a rating group corresponding to the quota request information; or
- first usage information, first indication information and a rating group corresponding to the first usage information, wherein the first indication information indicates that the first usage information is that of an online charging service; or
- second usage information, second indication information and a rating group corresponding to the second usage information, wherein the second indication information indicates that the second usage information is that of an offline charging service.

16. The charging method according to claim 14, wherein the resource update request comprises usage information and indication information indicating that the usage information is that of an online charging service or an offline charging service.

17. The charging method according to claim 12, wherein the charging method further comprises:
- receiving, by the charging system, a resource delete request sent by the charging trigger apparatus, wherein the resource delete request comprises a fourth resource identifier that is used to identify the resource; and
- deleting, by the charging system based on the resource delete request, the resource.

18. The charging method according to claim 17, wherein the resource delete request further comprises at least one of the following:
- first usage information, first indication information and a rating group corresponding to the first usage information, wherein the first indication information indicates that the first usage information is that of an online charging service; or
- second usage information, second indication information and a rating group corresponding to the second usage information, wherein the second indication information indicates that the second usage information is that of an offline charging service.

19. The charging method according to claim 17, wherein the resource delete request comprises usage information and indication information indicating that the usage information is that of an online charging service or an offline charging service.

20. The charging method according to claim 12, wherein the resource create request comprises usage information and indication information indicating that the usage information is that of an online charging service or an offline charging service.

21. A charging trigger apparatus, comprising:
at least one processor; and
one or more memories coupled to the at least one processor and storing programming instructions for execution by the at least one processor to:
- send a resource create request to a charging system, wherein the resource create request is used to request the charging system to create a resource for a session between a user equipment and a data network; and
- receive a resource create response from the charging system, wherein the resource create response comprises a first resource identifier that is used to identify the resource;

wherein the resource is used to manage at least one of:
- requesting for a quota for an online charging service in the session,
- reporting of usage information of an online charging service in the session, or
- reporting of usage information of an offline charging service in the session.

22. The charging trigger apparatus according to claim 21, wherein the one or more memories store the programming instructions for execution by the at least one processor to:
- send a resource update request to the charging system, wherein the resource update request comprises a second resource identifier, and the second resource identifier is the first resource identifier.

23. The charging trigger apparatus according to claim 22, wherein the resource update request comprises usage information and indication information indicating that the usage information is that of an online charging service or an offline charging service.

24. The charging trigger apparatus according to claim 21, wherein the one or more memories store the programming instructions for execution by the at least one processor to:
- send a resource delete request to the charging system, wherein the resource delete request comprises a fourth resource identifier that is used to identify the resource.

25. The charging trigger apparatus according to claim 24, wherein the resource delete request comprises usage information and indication information indicating that the usage information is that of an online charging service or an offline charging service.

26. The charging trigger apparatus according to claim 21, wherein the resource create request comprises usage information and indication information indicating that the usage information is that of an online charging service or an offline charging service.

27. A charging system, comprising:
at least one processor; and
one or more memories coupled to the at least one processor and storing programming instructions for execution by the at least one processor to:

receive a resource create request sent by a charging trigger apparatus, wherein the resource create request is used to request the charging system to create a resource for a session between a user equipment and a data network; and send a resource create response to the charging trigger apparatus, wherein the resource create response comprises a first resource identifier that is used to identify the resource created by the charging system in response to the resource create request;

wherein the resource is used to manage at least one of:
  requesting for a quota for an online charging service in the session,
  reporting of usage information of an online charging service in the session, or
  reporting of usage information of an offline charging service in the session.

28. The charging system according to claim 27, wherein the one or more memories store the programming instructions for execution by the at least one processor to:
  receive a resource update request sent by the charging trigger apparatus, wherein the resource update request comprises a second resource identifier that is used to identify the resource; and
  update the resource based on the resource update request.

29. The charging system according to claim 28, wherein the resource update request comprises usage information and indication information indicating that the usage information is that of an online charging service or an offline charging service.

30. The charging system according to claim 27, wherein the one or more memories store the programming instructions for execution by the at least one processor to:
  receive a resource delete request sent by the charging trigger apparatus, wherein the resource delete request comprises a fourth resource identifier that is used to identify the resource; and
  delete the resource based on the resource delete request.

31. The charging system according to claim 30, wherein the resource delete request comprises usage information and indication information indicating that the usage information is that of an online charging service or an offline charging service.

32. The charging system according to claim 27, wherein the resource create request comprises usage information and indication information indicating that the usage information is that of an online charging service or an offline charging service.

33. A communications system, comprising:
  a charging trigger apparatus, comprising one or more first processors and one or more first memories; and
  a charging system, comprising one or more second processors and one or more second memories;
  wherein the one or more first memories are coupled to the one or more first processors and store first programming instructions for execution by the one or more first processors to:
    send a resource create request to the charging system, wherein the resource create request is used to request the charging system to create a resource for a session between a user equipment and a data network;
    receive a resource create response from the charging system, wherein the resource create response comprises a first resource identifier that is used to identify the resource created by the charging system in response to the resource create request; and
  wherein the resource is used to manage at least one of:
    requesting for a quota for an online charging service in the session,
    reporting of usage information of an online charging service in the session, or
    reporting of usage information of an offline charging service in the session; and
  wherein the one or more second memories are coupled to the one or more second processors and store second programming instructions for execution by the one or more second processors to:
    receive the resource create request sent by the charging trigger apparatus; and
    send the resource create response to the charging trigger apparatus.

34. A charging method, comprising:
  sending, by a charging trigger apparatus, a resource create request to a charging system, wherein the resource create request is used to request the charging system to create a resource for a session between a user equipment and a data network;
  receiving, by the charging system, the resource create request sent by the charging trigger apparatus;
  sending, by the charging system, a resource create response to the charging trigger apparatus, wherein the resource create response comprises a first resource identifier that is used to identify the resource created by the charging system in response to the resource create request; and
  receiving, by the charging trigger apparatus, the resource create response from the charging system;
  wherein the resource is used to manage at least one of:
    requesting for a quota for an online charging service in the session,
    reporting of usage information of an online charging service in the session, or
    reporting of usage information of an offline charging service in the session.

35. The charging method according to claim 34, wherein the sending, by a charging trigger apparatus, a resource create request to a charging system comprises:
  when there is no available resource, sending, by the charging trigger apparatus, the resource create request to the charging system.

36. The charging method according to claim 34, wherein the resource create request comprises a session identifier and a user identifier corresponding to the user equipment, and wherein the session identifier is used to identify the session.

37. The charging method according to claim 34, wherein the resource create request comprises at least one of:
  quota request information for an online charging service and a rating group corresponding to the quota request information; or
  usage information, indication information and a rating group corresponding to the usage information, wherein the indication information indicates that the usage information is that of an offline charging service.

38. The charging method according to claim 34, wherein the resource create request comprises usage information and indication information indicating that the usage information is that of an online charging service or an offline charging service.

39. The charging method according to claim 34, further comprising:
  sending, by the charging trigger apparatus, a resource update request to the charging system, wherein the resource update request comprises a second resource identifier, and the second resource identifier is the first resource identifier;

receiving, by the charging system, the resource update request sent by the charging trigger apparatus; and updating, by the charging system based on the resource update request, the resource.

40. The charging method according to claim 39, wherein the resource update request further comprises at least one of the following:

quota request information for an online charging service, and a rating group corresponding to the quota request information; or first usage information, first indication information and a rating group corresponding to the first usage information, wherein the first indication information indicates that the first usage information is that of an online charging service; or second usage information, second indication information and a rating group corresponding to the second usage information, wherein the second indication information indicates that the second usage information is that of an offline charging service.

41. The charging method according to claim 39, wherein the resource update request comprises usage information and indication information indicating that the usage information is that of an online charging service or an offline charging service.

42. The charging method according to claim 34, further comprising:

sending, by the charging trigger apparatus, a resource delete request to the charging system, wherein the resource delete request comprises a fourth resource identifier, wherein the fourth resource identifier is the first resource identifier;

receiving, by the charging system, the resource delete request sent by the charging trigger apparatus; and deleting, by the charging system based on the resource delete request, the resource.

43. The charging method according to claim 42, wherein the resource delete request further comprises at least one of the following:

first usage information, first indication information and a rating group corresponding to the first usage information, wherein the first indication information indicates that the first usage information is that of an online charging service; or second usage information, second indication information and a rating group corresponding to the second usage information, wherein the second indication information indicates that the second usage information is that of an offline charging service.

44. The charging method according to claim 42, wherein the resource delete request comprises usage information and indication information indicating that the usage information is that of an online charging service or an offline charging service.

* * * * *